US012675631B2

(12) United States Patent
Teramoto et al.

(10) Patent No.: US 12,675,631 B2
(45) Date of Patent: Jul. 7, 2026

(54) INFORMATION PROCESSING DEVICE, INFORMATION PROCESSING METHOD, INFORMATION PROCESSING SYSTEM, AND CONVERSION MODEL

(71) Applicant: Sony Group Corporation, Tokyo (JP)

(72) Inventors: Toya Teramoto, Tokyo (JP); Kazuki Aisaka, Tokyo (JP); Takeshi Kunihiro, Tokyo (JP); Hiroki Danjo, Tokyo (JP); Kenji Yamane, Tokyo (JP)

(73) Assignee: Sony Group Corporation, Tokyo (JP)

( * ) Notice: Subject to any disclaimer, the term of this patent is extended or adjusted under 35 U.S.C. 154(b) by 279 days.

(21) Appl. No.: 18/548,925

(22) PCT Filed: Mar. 4, 2022

(86) PCT No.: PCT/JP2022/009526
§ 371 (c)(1),
(2) Date: Sep. 5, 2023

(87) PCT Pub. No.: WO2022/202233
PCT Pub. Date: Sep. 29, 2022

(65) Prior Publication Data
US 2024/0152692 A1 May 9, 2024

(30) Foreign Application Priority Data
Mar. 23, 2021 (JP) ................................. 2021-048079

(51) Int. Cl.
*G06F 40/169* (2020.01)
*G06V 20/70* (2022.01)
(52) U.S. Cl.
CPC ............ *G06F 40/169* (2020.01); *G06V 20/70* (2022.01)

(58) Field of Classification Search
CPC ...................................................... G06V 30/10
See application file for complete search history.

(56) References Cited

U.S. PATENT DOCUMENTS

2007/0078886 A1* 4/2007 Rivette .................. G06Q 50/18
                                                707/999.102
2011/0289401 A1* 11/2011 Fischer ................. G06F 40/103
                                                715/232

(Continued)

FOREIGN PATENT DOCUMENTS

CN        111867438 A  * 10/2020  ......... A61B 1/00042
CN        112567466 A  *  3/2021  ............. G16H 15/00

(Continued)

OTHER PUBLICATIONS

International Search Report and Written Opinion mailed on May 24, 2022, received for PCT Application PCT/JP2022/009526, filed on Mar. 4, 2022, 9 pages including English Translation.

*Primary Examiner* — Di Xiao
(74) *Attorney, Agent, or Firm* — XSENSUS LLP

(57) ABSTRACT

There is provided an information processing device including a storage unit that stores first annotation data generated from image data of a biological specimen and conversion processing information, a conversion unit that converts, using the conversion processing information, the first annotation data into a plurality of second annotation data incidental to the first annotation data, and an output unit that outputs the first annotation data or the second annotation data.

11 Claims, 11 Drawing Sheets

(56)　　　　　　References Cited

U.S. PATENT DOCUMENTS

| 2016/0019202 | A1* | 1/2016 | Adams | ............... | H04N 21/8547 |
| | | | | | 704/9 |
| 2019/0162550 | A1* | 5/2019 | Rao | ....................... | G06F 40/169 |
| 2020/0200907 | A1* | 6/2020 | Li | ........................... | G01S 17/89 |
| 2022/0414237 | A1* | 12/2022 | Lally | ..................... | G06N 20/00 |

FOREIGN PATENT DOCUMENTS

| JP | 2011-117991 | A | 6/2011 |
| JP | 2011-118005 | A | 6/2011 |
| JP | 2011-133849 | A | 7/2011 |
| WO | WO-2013099125 | A1 | 7/2013 |
| WO | 2016/136441 | A1 | 9/2016 |

* cited by examiner

ABSORPTION

802b

LINEAR
EXPANSION

INFORMATION PROCESSING DEVICE, INFORMATION PROCESSING METHOD, INFORMATION PROCESSING SYSTEM, AND CONVERSION MODEL

CROSS-REFERENCE TO RELATED APPLICATIONS

The present application is based on PCT filing PCT/JP2022/009526, filed Mar. 4, 2022, which claims priority from Japanese Patent Application No. 2021-048079, filed Mar. 23, 2021, the entire contents of each are incorporated herein by reference.

FIELD

The present disclosure relates to an information processing device, an information processing method, an information processing system, and a conversion model.

BACKGROUND

In recent years, a technology for automatically extracting a target region (for example, a legion region) from image data of a biological tissue such as a cell specimen and using an extraction result for diagnosis and research uses has been developed. According to the technology explained above, images (annotation data) of a plurality of known (labeled) target regions can be used for a pathological diagnosis, a model can be constructed using the images as teacher data of machine learning, and a target region can be automatically extracted from image data obtained anew using the constructed model.

CITATION LIST

Patent Literature

Patent Literature 1: JP 2011-117991 A

SUMMARY

Technical Problem

When the plurality of image data (annotation data) explained above are connected to form one image, an operation concerning display becomes very heavy if it is attempted to, for example, move or zoom an image according to a user's desire. Therefore, there has been a demand for a technology capable of freely displaying an image at high speed even if a plurality of image data are connected to form one image. At the same time, for use in a pathological diagnosis or the like, it has been demanded that image data are editable even in a connected image.

Therefore, the present disclosure proposes an information processing device, an information processing method, an information processing system, and a conversion model that can freely display, at high speed, an image obtained by connecting a plurality of image data and further edit each piece of image data.

Solution to Problem

According to the present disclosure, there is provided an information processing device including: a storage unit that stores first annotation data generated from image data of a biological specimen and conversion processing information;

a conversion unit that converts, using the conversion processing information, the first annotation data into a plurality of second annotation data incidental to the first annotation data; and an output unit that outputs the first annotation data or the second annotation data.

Furthermore, according to the present disclosure, there is provided an information processing method including: storing first annotation data generated from image data of a biological specimen and conversion processing information in a storage unit; converting, using the conversion processing information, the first annotation data into a plurality of second annotation data incidental to the first annotation data; and outputting the first annotation data or the second annotation data.

Furthermore, according to the present disclosure, there is provided an information processing system including: an information processing device that performs output processing for annotation data generated from image data of a biological specimen; and a program for causing the information processing device to execute the output processing. In the information processing system, the information processing device includes: a storage unit that stores first annotation data and conversion processing information; a conversion unit that converts, using the conversion processing information, the first annotation data into a plurality of second annotation data incidental to the first annotation data; and an output unit that outputs the first annotation data or the second annotation data.

Furthermore, according to the present disclosure, there is provided a conversion model for causing a computer to function to convert first annotation data generated from image data of a biological specimen into a plurality of second annotation data incidental to the first annotation data. The computer performs fitting processing on the first annotation data using the conversion model and generates the second annotation data having higher display magnification compared with display magnification of the first annotation data.

BRIEF DESCRIPTION OF THE DRAWINGS

FIG. 10 is a diagram (No. 2) for explaining the conversion processing according to the embodiment of the present disclosure.

DESCRIPTION OF EMBODIMENT

Figure 1:
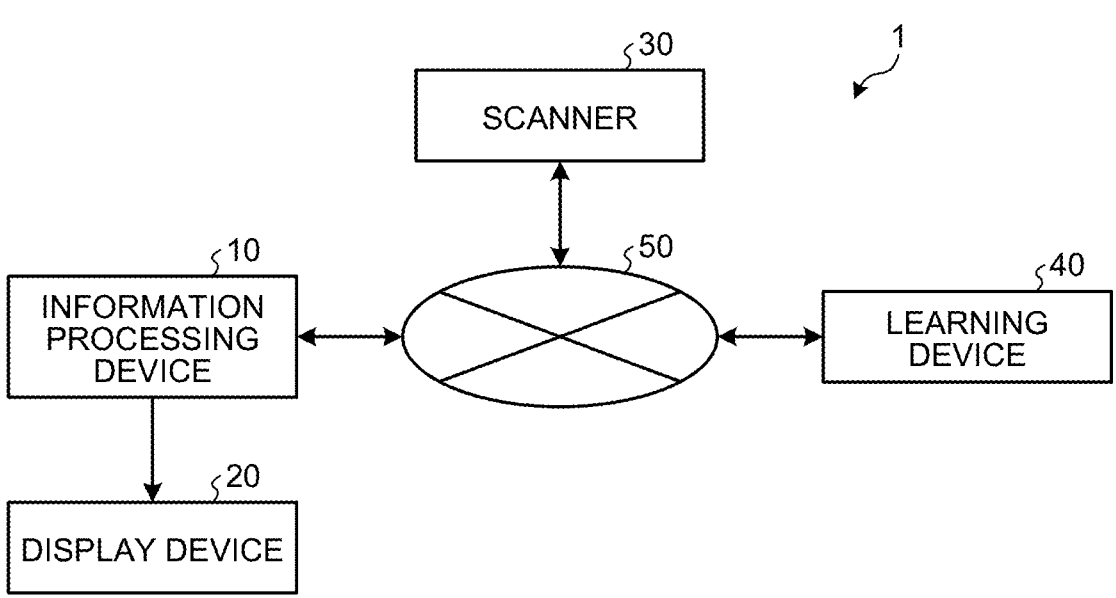
FIG. 1 is a diagram illustrating a configuration example of an information processing system according to an embodiment of the present disclosure.

A preferred embodiment of the present disclosure is explained in detail below with reference to the accompanying drawings. Note that, in the present specification and the drawings, components having substantially the same functional configurations are denoted by the same reference numerals and signs, whereby redundant explanation of the components is omitted. In addition, in the present specification and the drawings, a plurality of components having substantially the same or similar functional configurations are sometimes distinguished by attaching different alphabets after the same reference numerals. However, when it is not particularly necessary to distinguish each of the plurality of components having substantially the same or similar functional configurations, only the same reference numerals and signs are attached.

Note that the explanation is made in the following order.
1. Background leading to creation of an embodiment of the present disclosure
1.1 Configuration example of an information processing system 1
1.2 Background
2. Embodiment
2.1 Functional configuration example of an information processing device 10
2.2 Functional configuration example of a processing unit 100
2.3 Fitting processing
2.4 Information processing method
3. Summary
4. Application Example
4.1 Microscope system
4.2 Pathological diagnosis system
5. Hardware Configuration
6. Supplement

1. Background Leading to Creation of an Embodiment of the Present Disclosure

1.1 Configuration Example of an Information Processing System 1

First, before an embodiment of the present disclosure is explained, a background leading to creation of the embodiment of the present disclosure by the present inventors is explained.

In the medical field, a pathologist sometimes performs a diagnosis using a pathological image. However, a diagnosis result for the same pathological image is sometimes different depending on a pathologist. Such variations in diagnoses are caused by, for example, experience values such as years of experience of pathologists and differences in expertise. It is difficult to avoid variations in diagnoses. Therefore, in recent years, a technology for deriving diagnosis support information, which is information for supporting pathological diagnoses, using machine learning has been developed for the purpose of supporting all pathologists to be able to perform highly accurate pathological diagnoses. Specifically, in the technology, a plurality of pathological images in which labels (annotations) are attached to target regions (for example, a lesion region) to be noted in the pathological images are prepared and these pathological images are machine-learned to thereby construct a discriminator and data (model data) to be used by the discriminator. Then, by using the discriminator constructed by such machine learning and the model data to be used by the discriminator, it is possible to automatically extract images of the target regions to be noted in a new pathological image. With such a technique, since information concerning the target regions to be noted in the new pathological image can be provided to a pathologist, the pathologist can more appropriately perform a pathological diagnosis of the pathological image. Note that, in the present specification, data obtained by attaching a label (an annotation) to an image of a target region (for example, a lesion region) that can be used not only for a diagnosis by a pathologist but also as teacher data of machine learning is referred to as annotation data.

The construction of the discriminator and the model data to be used by the discriminator is mainly realized by three stages of processing including "preparation of a pathological image", "creation of annotation data", and "machine learning". Here, the label (the annotation) attached to the target region (for example, the lesion region) can be information concerning various target regions. For example, the information can include diagnosis results such as a subtype of "cancer", a stage of "cancer", and a degree of differentiation of cancer cells and analysis results such as presence or absence of a lesion in a target region, a probability that a lesion is included in the target region, a position of the lesion, and a type of the lesion. Note that the degree of differentiation can be used to predict information indicating, for example, which drug (anticancer agent or the like) is likely to work.

Next, a configuration example of an information processing system 1 according to the embodiment of the present disclosure is explained. FIG. 1 is a diagram illustrating a configuration example of the information processing system 1 according to the embodiment of the present disclosure. As illustrated in FIG. 1, the information processing system 1 according to the embodiment of the present disclosure includes an information processing device 10, a display device 20, a scanner 30, a learning device 40, and a network 50. The information processing device 10, the scanner 30, and the learning device 40 are configured to be able to communicate with one another via the network 50. As a communication scheme used in the network 50, any scheme can be applied regardless of a wired or wireless scheme. However, it is desirable to use a communication scheme that can maintain a stable operation. In the present embodiment, the information processing device 10 and the display device 20 may be separate devices as illustrated in FIG. 1 or may be an integrated device and are not particularly limited. In the following explanation, an overview of the devices included in the information processing system 1 is explained.

(Information Processing Device 10)

The information processing device 10 is configured by, for example, a computer and can generate annotation data to be used for machine learning and output the annotation data to the learning device 40 explained below. For example, the information processing device 10 is used by a user (for example, a doctor or a laboratory technician). In the embodiment of the present disclosure, a case in which various kinds of operation by the user are input to the information processing device 10 via a mouse (not illustrated) or a pen tablet (not illustrated) is mainly assumed. However, in the present embodiment, the various kinds of operation by the user may be input to the information processing device 10 via a not-illustrated terminal. In the present embodiment, a case in which various kinds of presentation information to the user are output from the information processing device 10 via the display device 20 is mainly assumed. However, in the present embodiment, the various kinds of presentation information to the user may be output from the information processing device 10 via a not-illustrated terminal. Note that details of the information processing device 10 according to the embodiment of the present disclosure are explained below.

(Display Device 20)

The display device 20 is, for example, a display device such as liquid crystal, electro luminescence (EL), or cathode ray tube (CRT) display device and can display a pathological image according to control of the information processing device 10 explained above. Further, a touch panel that receives input from the user may be superimposed on the display device 20. Note that, in the present embodiment, the display device 20 may be adapted to 4K or 8K or may be configured by a plurality of display devices and is not particularly limited. Then, while viewing the pathological image displayed on the display device 20, the user can freely designate a target region (for example, a lesion region) to be noted on the pathological image or add an annotation (a label) to the target region using the mouse (not illustrated), the pen tablet (not illustrated), or the like explained above (editing work).

(Scanner 30)

The scanner 30 can read a biological tissue such as a cell specimen obtained from a specimen. Consequently, the scanner 30 generates a pathological image showing the biological tissue and outputs the pathological image to the information processing device 10 explained above. For example, the scanner 30 includes an image sensor and generates a pathological image (image data) by imaging the biological tissue with the image sensor. A reading scheme of the scanner 30 is not limited to a specific type. Note that, in the present embodiment, the reading scheme of the scanner 30 may be a CCD (Charge Coupled Device) type or may be a CIS (Contact Image Sensor) type and is not particularly limited. Here, the CCD type can be equivalent to a type in which light (reflected light or transmitted light) from a biological tissue is read by a CCD sensor and the light read by the CCD sensor is converted into image data. On the other hand, the CIS scheme can be equivalent to a type in which LEDs (Light Emitting Diodes) of three colors of RGB are used as a light source, light (reflected light or transmitted light) from a biological tissue is read by a photosensor, and a read result is converted into image data.

Note that, in the embodiment of the present disclosure, a case in which a pathological image showing a lesion region is used as image data is mainly assumed and explained. However, the image data according to the embodiment of the present disclosure is not limited to the lesion image. In the present embodiment, the pathological image also includes one image obtained by connecting a plurality of images obtained by continuously photographing a biological tissue (a slide) set on a stage of a scanner (a microscope including an image sensor). A scheme for connecting a plurality of images to generate one image in this way is called whole slide imaging (WSI).

(Learning Device 40)

The learning device 40 is configured by, for example, a computer and can construct a discriminator and model data to be used by the discriminator by performing machine learning using a plurality of annotation data. By using the discriminator constructed by the learning device 40 and the model data to be used by the discriminator, it is possible to automatically extract an image of a target region to be noted in a new pathological image. Deep learning can be typically used for the machine learning. Note that, in the explanation of the embodiment of the present disclosure, when the discriminator is implemented by a neural network, the model data can be equivalent to the weight of neurons of a neural network. However, the discriminator may be implemented by other than the neural network. In the present embodiment, for example, the discriminator may be implemented by a random forest, may be implemented by a support vector machine, or may be implemented by Ada-Boost and is not particularly limited.

Specifically, the learning device 40 acquires a plurality of annotation data and calculates a feature value of an image of a target region included in the annotation data. The feature value may be anything such as a cell nucleus or a color feature (luminance, saturation, wavelength, spectrum, and the like) of the cell nucleus, a shape feature (circularity and circumferential length), density, a distance from a specific form, a local feature value, structure extraction processing (nucleus detection and the like), and information obtained by aggregating the foregoing (cell density, orientation, and the like). For example, the learning device 40 inputs the image of the target region to an algorithm such as a neural network to thereby calculate a feature value of the image. Further, the learning device 40 aggregates feature values of each of images of a plurality of target regions to which the same annotation (label) is attached to thereby calculate a representative feature value, which is a feature value of the entire plurality of target regions. For example, the learning device 40 calculates the representative feature value of the entire plurality of target regions based on a feature value such as an LBP (Local Binary Pattern) focusing on a distribution (for example, a color histogram) of feature values of images of each of the plurality of target regions and a texture structure of the images. The discriminator is capable of extracting images other target regions similar to the target region among regions included in a new pathological image based on the calculated feature value of the target region. That is, in order to improve the accuracy of learning, a large amount of annotation data to be used for the learning is requested to be appropriately edited data.

Note that, in the embodiment of the present disclosure, the learning device 40 may not be included in the information processing system 1 and another device not illustrated in FIG. 1 may be included in the information processing system 1.

Note that, in the embodiment of the present disclosure, as illustrated in FIG. 1, a case in which the information processing device 10, the scanner 30, and the learning device 40 are present as separate devices is mainly assumed. However, in the present embodiment, a part or all of the information processing device 10, the scanner 30, and the learning device 40 may be present as an integrated device. Alternatively, in the present embodiment, a part of the functions of any one of the information processing device 10, the scanner 30, and the learning device 40 may be incorporated in another device.

1.2 Background

Figure 2:
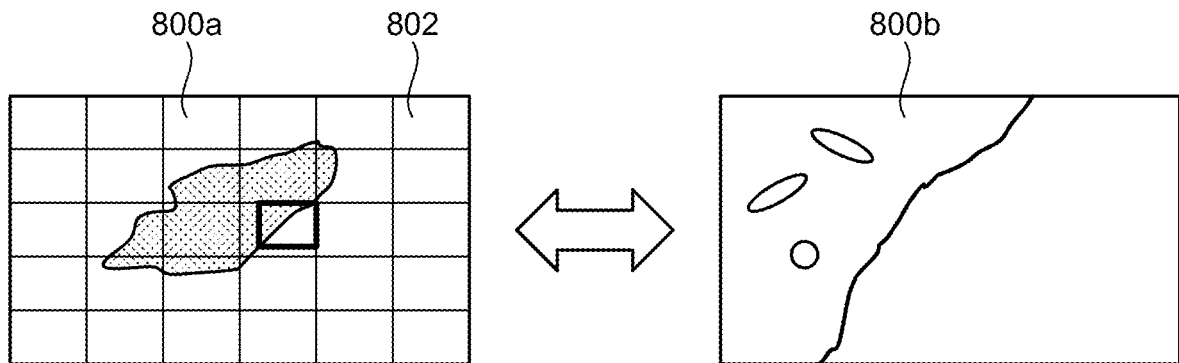
FIG. 2 is a diagram illustrating an example of image display according to the embodiment of the present disclosure.
Figure 3:
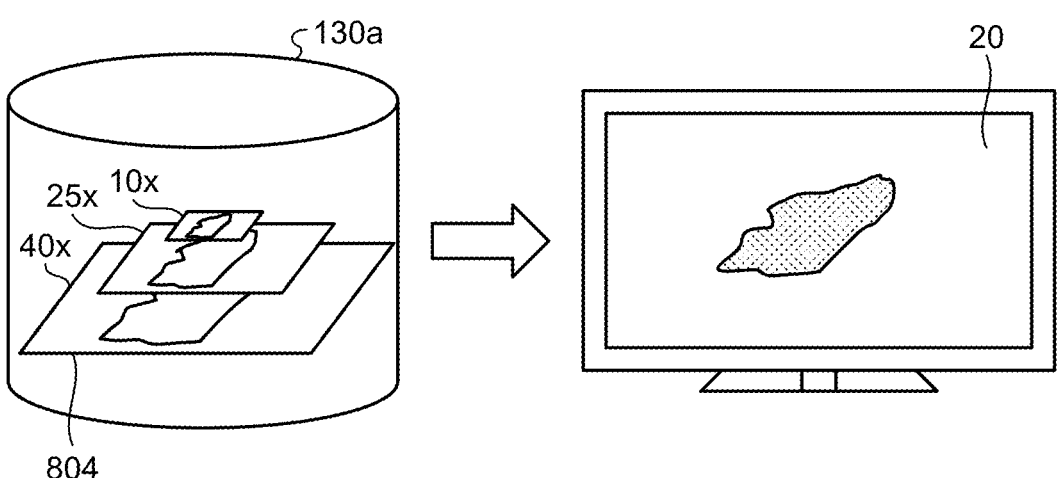
FIG. 3 is a diagram for explaining a related art.
Figure 4:
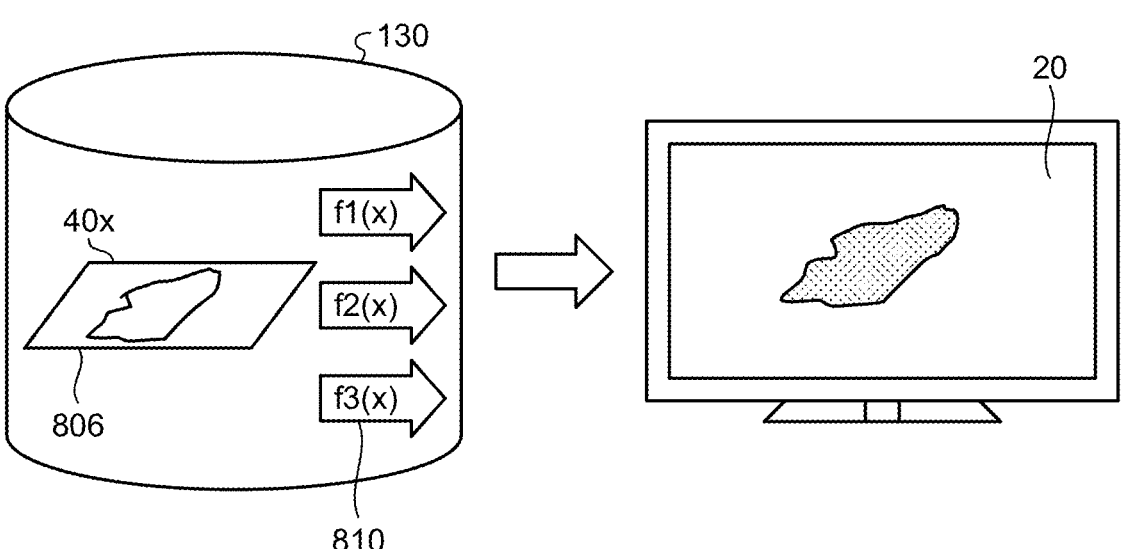
FIG. 4 is a diagram for explaining an overview of the embodiment of the present disclosure.
Figure 5:
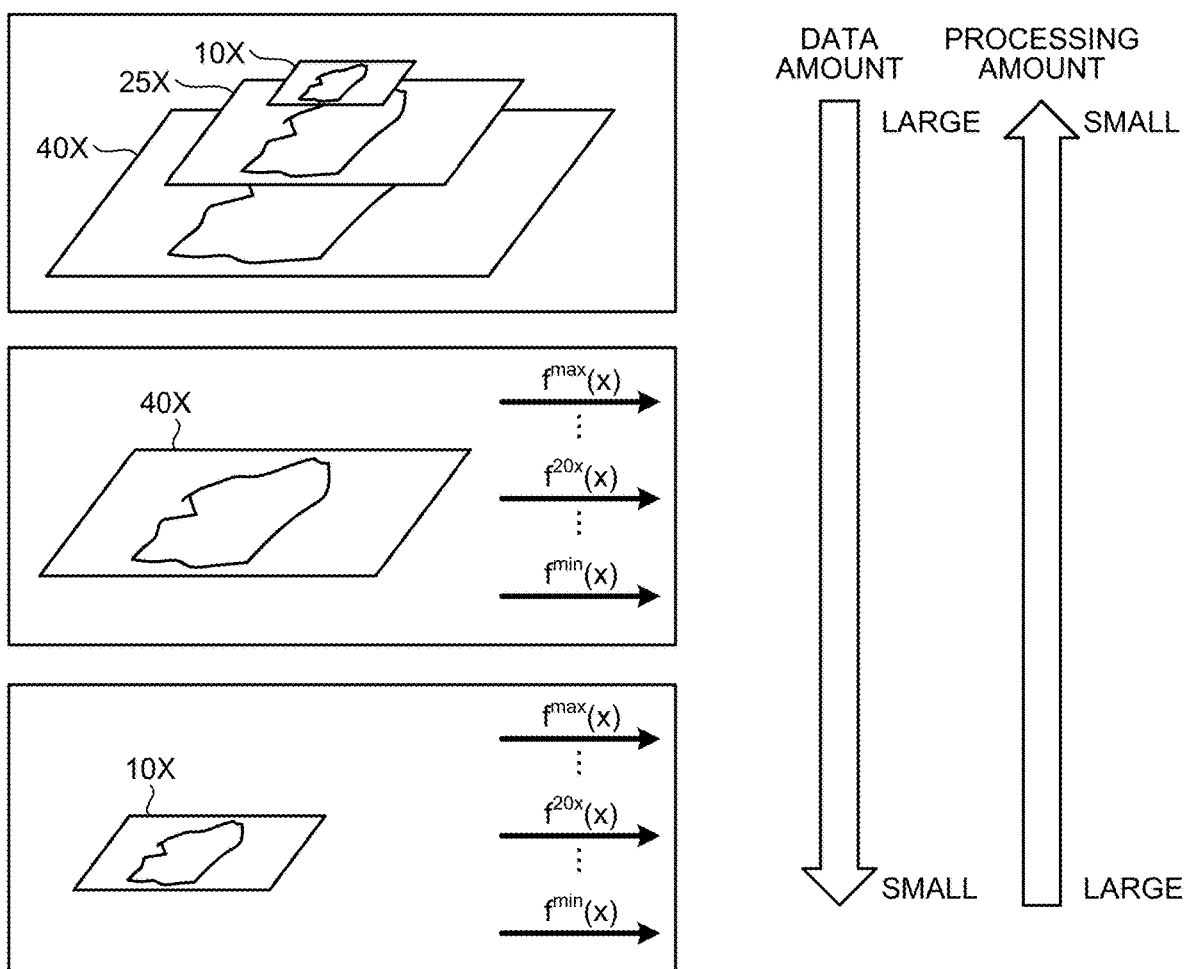
FIG. 5 is a diagram for explaining comparison of the embodiment of the present disclosure and the related art.

Further, a background leading to creation of the embodiment of the present disclosure by the present inventors is explained with reference to FIG. 2 to FIG. 5. FIG. 2 is a diagram illustrating an example of image display in the embodiment of the present disclosure. FIG. 3 is a diagram for explaining the related art. FIG. 4 is a diagram for explaining an overview of the embodiment of the present disclosure. FIG. 5 is a diagram for explaining a comparison between the embodiment of the present disclosure and the related art.

It is possible to create annotation data using the information processing device 10 explained above by searching for a predetermined feature point (visual search) from image data acquired by the scanner 30 or by segmenting an image of a cell nucleus having a predetermined form. In such a case, a large amount of annotation data is created in units of several thousand to several one hundred thousand. In particular, when the annotation data is to be used for a pathological diagnosis or the like, a large amount of annotation data is prepared according to display forms because various display variations are requested.

For example, as illustrated on the left side of FIG. 2, when a large amount of annotation data 802 is to be displayed as WSI (that is, the plurality of annotation data are connected to form one image 800a), if low magnification is set, all of the large amount of annotation data 802 are displayed on the display device 20. Therefore, operation concerning movement of image 800a becomes very heavy. Further, as illustrated on the right side of FIG. 2, also when a part of the image 800a is enlarged and an enlarged image 800b is displayed, an operation becomes very heavy. That is, in the related art, it is difficult to smoothly perform enlarged and reduced display of the connected plurality of annotation data 802. When such connected annotation data 802 is used for a pathological diagnosis or the like, it is also requested that the annotation data 802 can be smoothly edited.

For example, in order to appropriately edit a large amount of annotation data 802 used for machine learning, it is requested that the annotation data 802 can be freely edited and freely displayed at a high speed according to the user's desire.

As means for responding to such a request, as illustrated in FIG. 3, it is conceivable to acquire, in advance, a plurality of image data 804 obtained by connecting a plurality of annotation data 802 having various magnifications into one image in a storage unit 130a of the information processing device 10. When such means is used, the image data 804 can be acquired and output to the display device 20 according to magnification desired by the user.

However, since the image data 804 explained above has an extremely large file size (data amount), a load of processing for extracting and displaying data is large and the annotation data 802 cannot be edited. As other means, it is conceivable that the information processing device 10 stores only point cloud data in advance and uses the point cloud data to display the image data 804 in which the plurality of annotation data 802 are connected into one image. However, when such means is used, even if it is possible to edit the annotation data 802, it takes time to perform the display processing. Therefore, it is difficult to freely display the image data 804 at high speed according to the user's desire.

Therefore, in view of such a situation, the present inventors created the embodiment of the present disclosure explained below. In the embodiment of the present disclosure, as illustrated in FIG. 4, a storage unit 130 of the information processing device 10 stores an annotation data group (for example, an annotation data group of reference magnification (for example, 40 times)) 806 serving as a reference and conversion parameters 810 (for example, a conversion formula fn(x)) for conversion processing into other annotation data 802 (for example, other magnification annotation data) incidental to the annotation data group 806 in association with the annotation data group 806 serving as the reference. Note that, here, a set of the annotation data 802 created from images of different regions captured by photographing the same subject under the same conditions (for example, magnification) is referred to as annotation data group 806. That is, it can be considered that the annotation data 802 included in such an annotation data group 806 is (WSI) image data that can be connected.

Specifically, in the present embodiment, the information processing device 10 stores the annotation data 802 (or the annotation data group 806) serving as a reference and performs, according to necessity, conversion processing on the reference annotation data 802 serving as the reference using the conversion parameters 810 to generate new annotation data 802 incidental to the annotation data 802. Further, in the present embodiment, when the user edits the annotation data 802, the editing processing is reflected on other incidental annotation data 802 as well. In this way, for example, even if variations of display forms increase, it is possible to cope with the increase.

For example, when a plurality of image data 804 having various magnifications, which is the related art, illustrated in an upper part of FIG. 5 are stored in advance, an amount of data increases and, since conversion is unnecessary, a processing amount of conversion decreases. On the other hand, for example, when the annotation data group 806 having the magnification serving as the reference and the conversion parameters 810, which are the embodiment of the present disclosure, illustrated in a middle part and a lower part of FIG. 5 are stored in advance and conversion is performed according to the user's desire, the processing amount increases because the conversion is performed, however, the data amount decreases. Further, when the magnification serving as the reference is large, the data amount increases but the processing amount is relatively small. On the other hand, when the magnification serving as the reference is small, the data amount decreases but the processing amount is relatively large. Therefore, in the embodiment of the present disclosure, it is preferable to select the magnification serving as the reference and more appropriately adjust the data amount and the processing amount according to a use, a subject, the specifications of the information processing device 10, and the like. By performing such selection and adjustment, even if a load of conversion processing for conversion increases, it is possible to suppress an increase in a load of display processing for extracting and displaying data. As a result, it is possible to freely display the data at high speed according to the user's desire. Further, in the embodiment of the present disclosure, a display form may be optimized in order to suppress an increase in the load of the display processing without losing information desired by the user.

As explained above, in the embodiment of the present disclosure, instead of storing the plurality of image data 804 having various magnifications, the annotation data group 806 serving as the reference and the conversion parameters 810 for the conversion processing into the other annotation data 802 incidental to the annotation data group 806 are stored. In this way, it is possible to reduce an amount of data to be stored and to suppress an increase in the load of the display processing, although it is possible to edit the annotation data 802. That is, in the embodiment of the present disclosure, it is possible to freely display a large amount of annotation data 802 at a high speed (for example, at desired or suitable magnification) according to the user's desire. Further, it is also possible to edit each piece of the annotation data 802. In addition, according to the present embodiment, it is possible to flexibly cope with a situation in which a plurality of display forms are requested. In the following explanation, details of the embodiment of the present disclosure created by the present inventors are sequentially explained.

In the following explanation, a tissue section or a cell, which is a part of a tissue (for example, an organ or an epithelial tissue) acquired from an organism (for example, a human body or a plant) is referred to as biological specimen. Further, in the following explanation, various types of a target region in an image are assumed. For example, as an example of the target region, a tumor region is mainly assumed. Besides, examples of the target region include a region having a specimen, a tissue region, an artifact region, an epithelial tissue, a squamous epithelium, a glandular region, a cellular atypical region, and a tissue atypical region. A biological specimen explained below may be subjected to various kinds of staining as necessary. In other words, in the embodiment explained below, unless particularly noted otherwise, the biological specimen may or may not be subjected to various kinds of staining and is not particularly limited. Further, for example, the staining includes not only general staining represented by HE (hematoxylin-eosin) staining, Giemsa staining, or Papanicolaou staining but also periodic acid-Schiff (PAS) staining or the like used when focusing on a specific tissue and fluorescent staining such as FISH (Fluorescence In-Situ Hybridization) or an enzyme antibody method.

2. Embodiment

2.1 Functional Configuration Example of the Information Processing Device 10

Figure 6:
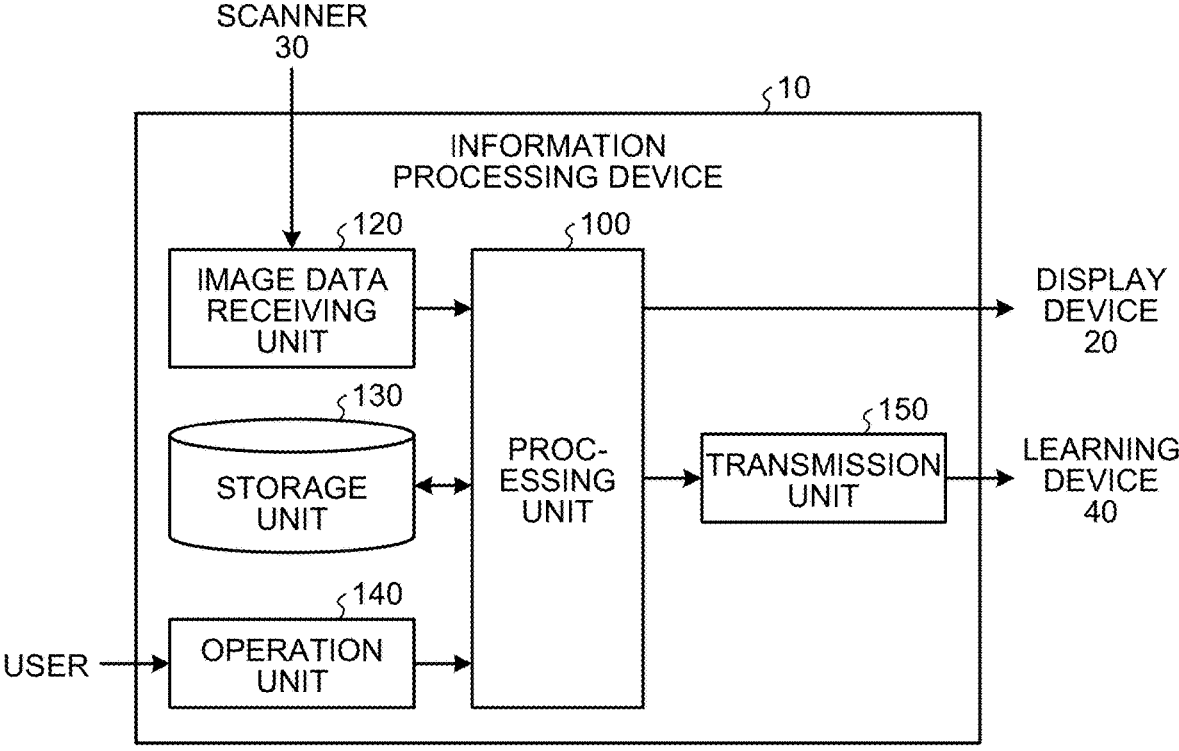
FIG. 6 is a diagram illustrating a functional configuration example of an information processing device according to the embodiment of the present disclosure.

First, a functional configuration example of the information processing device 10 according to the embodiment of the present disclosure is explained with reference to FIG. 6. FIG. 6 is a diagram illustrating a functional configuration example of the information processing device 10 according to the present embodiment. Specifically, as illustrated in FIG. 6, the information processing device 10 mainly includes a processing unit 100, an image data receiving unit 120, a storage unit 130, an operation unit (an input unit) 140, and a transmission unit 150. In the following explanation, details of the functional units of the information processing device 10 are sequentially explained.
(Processing Unit 100)

The processing unit 100 can generate the annotation data 802 from a pathological image based on the pathological image (image data) and input operation from the user. The processing unit 100 functions by, for example, a program stored in the storage unit 130 explained below being executed by a CPU (Central Processing Unit) or an MPU (Micro Processing Unit using a RAM (Random Access Memory) or the like as a work area. The processing unit 100 may be configured by, for example, an integrated circuit such as an ASIC (Application specific Integrated Circuit) or an FPGA (Field Programmable Gate Array). Note that details of the processing unit 100 are explained below.
(Image Data Receiving Unit 120 and Transmission Unit 150)

The image data receiving unit 120 and the transmission unit 150 include communication circuits. The image data receiving unit 120 can receive a pathological image (image data) from the scanner 30 via the network 50. The image data receiving unit 120 outputs the received pathological image to the processing unit 100 explained above. On the other hand, when the annotation data 802 is output from the processing unit 100, the transmission unit 150 can transmit the annotation data 802 to the learning device 40 via the network 50.
(Storage Unit 130)

The storage unit 130 is implemented by, for example, a semiconductor memory element such as a RAM or a flash memory or a storage device such as a hard disk or an optical disk. The storage unit 130 stores the annotation data 802 already generated by processing unit 100, a program to be executed by processing unit 100, and the like.

Specifically, the storage unit 130 stores a plurality of annotation data (first annotation data) 802 generated from image data received from the scanner 30. For example, the annotation data 802 may be a labeled image itself or may be point cloud coordinate data including coordinates of a fine point cloud representing a contour line or the like on the image. Further, the storage unit 130 may store, for example, a plurality of other annotation data (third annotation data) 802 having different display schemes and display magnifications incidentally to the annotation data 802.

For example, in the present embodiment, the annotation data 802 having the magnification serving as the reference only has to be stored in the storage unit 130 and the annotation data 802 having the other magnifications may be stored or may not be stored. Further, in the present embodiment, the annotation data 802 having the magnification serving as the reference is not limited to having the maximum magnification.

The storage unit 130 can store the conversion parameters (conversion processing information and a conversion model) 810 used to convert the annotation data (first annotation data) 802 stored in advance into a plurality of other annotation data (second annotation data) 802 incidental to the annotation data 802. Further, the storage unit 130 may further store editing processing information concerning editing for the annotation data 802.
(Operation Unit 140)

The operation unit 140 has a function of receiving input of operation by the user and can receive, for example, editing operation (for example, addition of information such as a diagnosis result) for the annotation data (the first annotation data) 802 by the user. In the embodiment of the present disclosure, it is mainly assumed that the operation unit 140 includes a mouse and a keyboard. However, in the present embodiment, the operation unit 140 is not limited to including the mouse and the keyboard. In the present embodiment, for example, the operation unit 140 may include an electronic pen, may include a touch panel, or may include an image sensor that detects a line of sight.

Note that the configuration explained above with reference to FIG. 6 is only an example. The configuration of the information processing device 10 according to the present embodiment is not limited to such an example. That is, the configuration of the information processing device according to the present embodiment can be flexibly modified according to specifications and operations.

2.2 Functional Configuration Example of the Processing Unit 100

Figure 7:
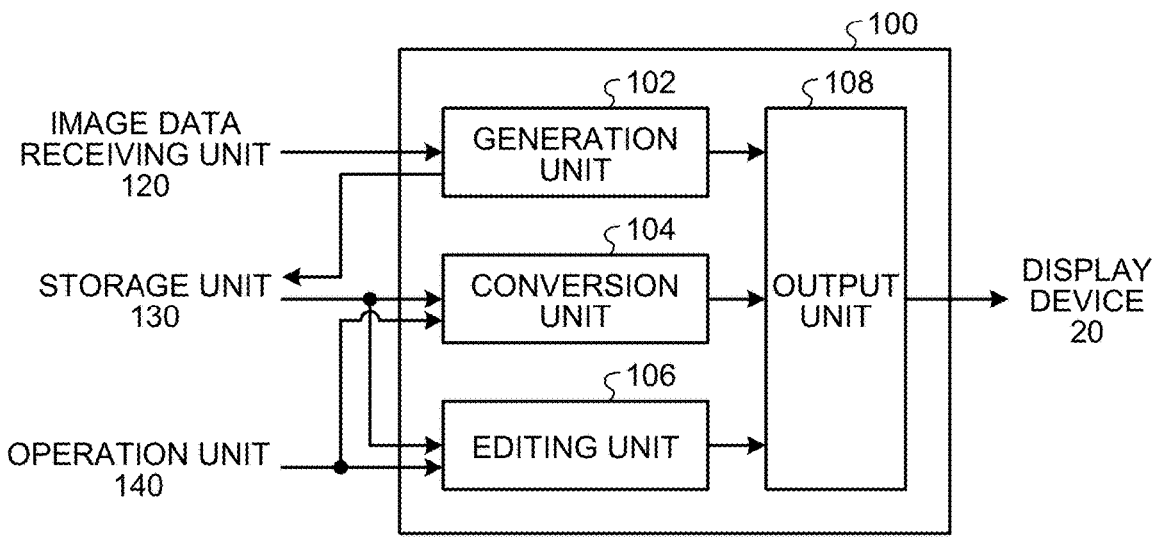
FIG. 7 is a diagram illustrating a functional configuration example of a processing unit 100 illustrated in FIG. 6.
Figure 8:
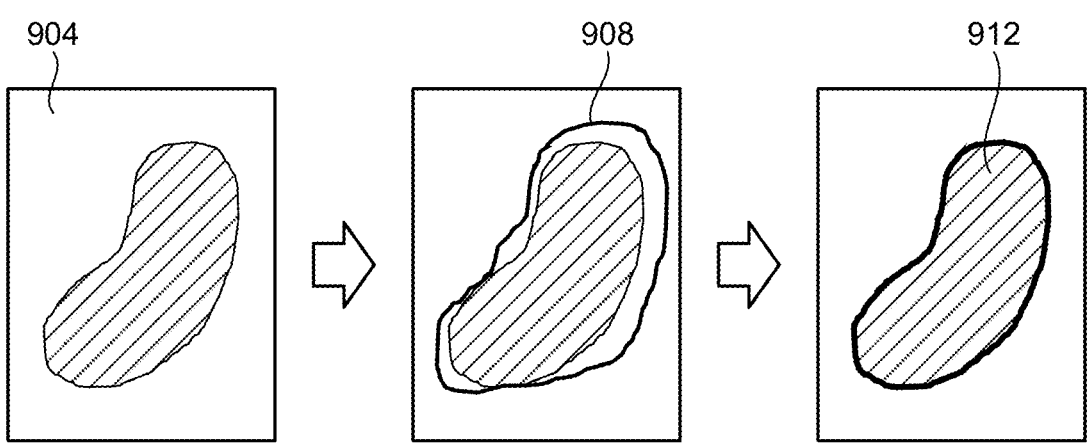
FIG. 8 is a diagram for explaining fitting processing according to the embodiment of the present disclosure.
Figure 9:
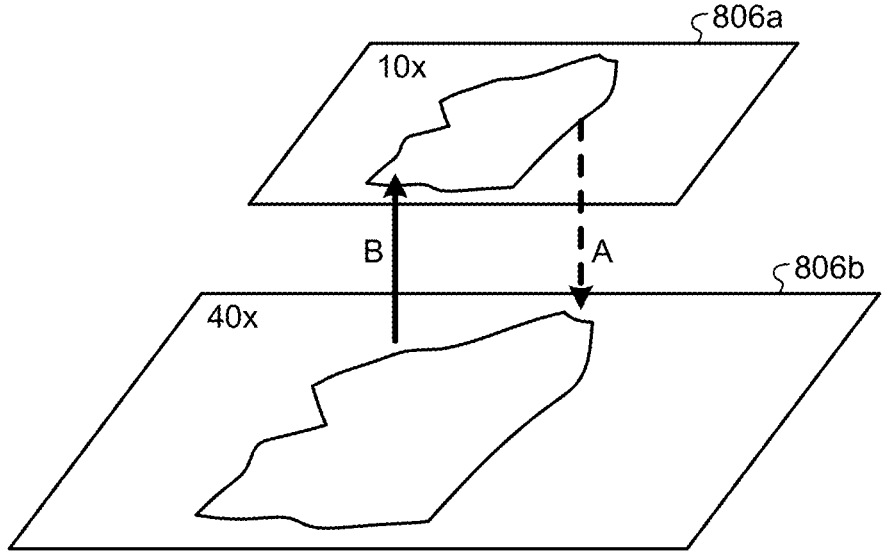
FIG. 9 is a diagram (No. 1) for explaining conversion processing according to the embodiment of the present disclosure.
Figure 10:
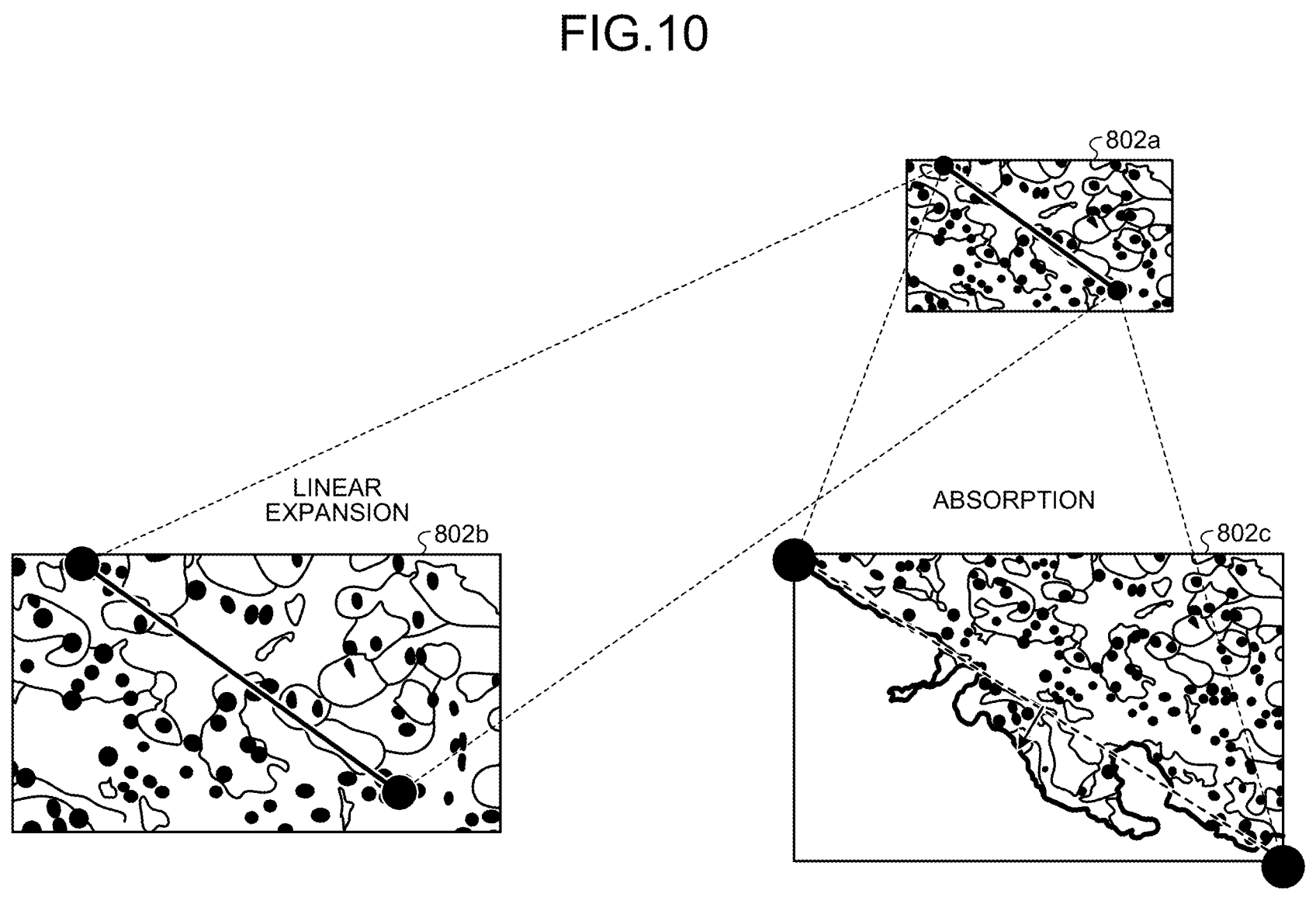
Figure 11:
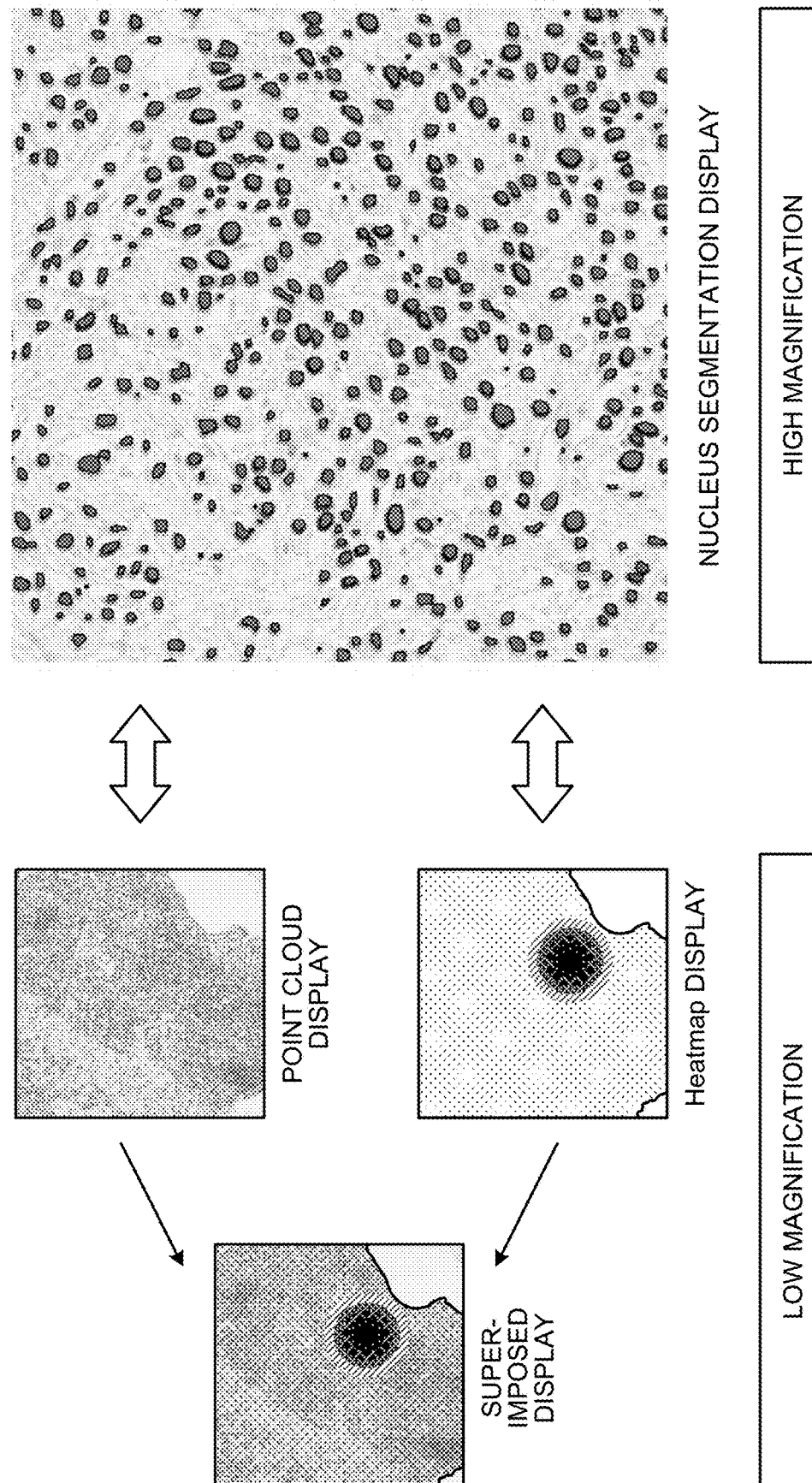
FIG. 11 is a diagram (No. 3) for explaining the conversion processing according to the embodiment of the present disclosure.

Next, a functional configuration example of the processing unit 100 explained above is explained with reference to FIG. 7 to FIG. 11. FIG. 7 is a diagram illustrating a functional configuration example of the processing unit 100 illustrated in FIG. 6. FIG. 8 is a diagram for explaining fitting processing according to the present embodiment. FIG. 9 to FIG. 11 are diagrams for explaining conversion processing according to the present embodiment.

Specifically, as illustrated in FIG. 7, the processing unit 100 mainly includes a generation unit 102, a conversion unit 104, an editing unit 106, and an output unit 108. In the following explanation, details of the functional units of the processing unit 100 are sequentially explained.
(Generation Unit 102)

The generation unit 102 generates a plurality of annotation data (first annotation data) 802 from image data received from the scanner 30. Specifically, the generation unit 102 extracts an image of a target region requested by the user from the image data and generates the annotation data 802 by attaching a label to the extracted image of the target region.

More specifically, as illustrated in FIG. 8, the user draws a curve 908 on image data 904 using a mouse (not illustrated) or the like to designate a boundary indicating a range of target region 912, and extracts an image of the designated range to generate annotation data 802. Note that deviation easily occurs between a region surrounded by the curve 908 drawn by the user and a contour of the target region 912 desired by the user. Therefore, in the present embodiment, the generation unit 102 performs fitting processing (correction) based on the image data 904 and the curve 908 drawn by the user to thereby acquire a contour of a desired target region 912 and extracts an image of the target region 912 from the image data based on the acquired contour. That is, in the present embodiment, by executing the fitting processing, even if the curve 908 drawn by the user deviates from the contour of the target region, the contour of the target region 912 can be accurately acquired as intended by the user. Examples of a method of the fitting processing applicable here include "foreground/background fitting", "cell membrane fitting", and "cell nucleus fitting", details of which are explained below.

In the present embodiment, examples of the contour of the target region include a boundary between a tumor region and a non-tumor region, a boundary between a region having a specimen and a region having no specimen, a boundary between a tissue (foreground) region and a blank (background) region, a boundary between an artifact region and a non-artifact, a boundary between an epithelial tissue and a non-epithelial tissue, a boundary between a squamous epithelium and a non-squamous epithelium, a boundary between a glandular region and a non-glandular region, a boundary between a cellular atypical region and other regions, and a boundary between a tissue atypical region and other regions. The fitting processing can be performed by using such boundaries More specifically, the generation unit 102 can generate annotation data 802 as explained below. Note that, here, the generation unit 102 is explained as executing "foreground/background fitting".

The generation unit 102 can perform fitting by extracting the contour of the target region (a region having a specimen, a tissue region, an artifact region, an epithelial tissue, a squamous cell, a glandular region, a cellular variant region, a tissue variant region, and the like) 912 using a segmentation algorithm by graph cut based on the information concerning the curve 908 designated by the user's input operation on the image data and the contour on the image data 904. Alternatively, machine learning may be used for the segmentation algorithm. Note that, in the fitting, the contour of the target region 912 may be determined such that the certainty (reliability) of the contour is higher. In the present embodiment, by executing such fitting processing, a large amount of highly accurate annotation data 802 can be efficiently generated.

Further, the contour search in the fitting processing is performed in a range a predetermined distance apart from the curve 908 designated by the user's input operation (having a predetermined width). In the following explanation, a range in which a contour is searched in the fitting processing is referred to as a "search range". For example, a range separated by a predetermined distance along the normal direction with respect to the curve 908 designated by the input operation can be set as the search range.

In the present embodiment, when the target region 912 intended by the user cannot be acquired by the fitting processing, correction may be repeatedly added by the user.
(Conversion Unit 104)

The conversion unit 104 can convert, using the conversion parameters (the conversion processing information and the conversion model) 810 stored in the storage unit 130, the plurality of annotation data (the first annotation data) 802 generated from the image data received from the scanner 30 into the plurality of annotation data (second annotation data) 802 incidental to the annotation data 802. Specifically, the conversion unit 104 can convert point cloud coordinate data, which is obtained by converting the annotation data 802 serving as the reference into data as point cloud coordinates, into other annotation data 802 using a predetermined conversion formula stored in the storage unit 130 as a conversion parameter.

In the present embodiment, for example, as illustrated in FIG. 9, the conversion unit 104 can perform conversion from the annotation data 802a having low magnification into the annotation data 802b having high magnification (conversion A) and conversion from the annotation data 802b having high magnification into the annotation data 802a having low magnification (conversion B).

First, the case of the conversion A is explained. In the case of the conversion A, as illustrated on the left side of FIG. 10, by simply linearly enlarging the annotation data 802a having low magnification, the annotation data 802b having high magnification can be acquired.

When the linear enlargement explained above is performed, since the annotation data 802b having high magnification to be obtained is a sparse (faint) image, the user sometimes cannot obtain necessary information from the annotation data 802b having high magnification. Therefore, in the present embodiment, as illustrated on the right side of FIG. 10, the annotation data 802a having low magnification is not simply linearly enlarged, the fitting processing explained above may be performed and an amount of data may be compensated using information such as a contour obtained by the fitting processing and, then, the annotation data 802a may be linearly enlarged to acquire the annotation data 802b having high magnification. Alternatively, in the present embodiment, fitting processing may be performed after the annotation data 802*a* having low magnification is linearly enlarged and a data amount may be compensated using information such as a contour obtained by the fitting processing to acquire the annotation data 802*b* having high magnification. Details of a method of the fitting processing is explained below.

Next, the conversion B will be explained. In the case of the conversion B, for example, by performing existing compression processing such as JPEG or GIF on the annotation data 802*b* having high magnification, the annotation data 802*a* having low magnification can be acquired.

In the present embodiment, the conversion unit 104 can perform not only conversion magnification but also conversion of a display form. For example, the conversion unit 104 can perform conversion into nucleus segmentation display (specifically, segmentation of an image of a cell nucleus having a predetermined morphology), point cloud display, heat map display, or the like illustrated in FIG. 11. Further, in the present embodiment, the conversion unit 104 may convert a display scheme simultaneously with the conversion of the magnification explained above. Specifically, for example, when the annotation data 802 of the nucleus segmentation display illustrated on the right side of FIG. 11 is converted to low magnification, information such as a contour useless for the user is included. Therefore, in the present embodiment, in conversion into low magnification, conversion to point cloud display (at points, distribution of nuclei is shown) illustrated in the upper center of FIG. 11 or Heatmap display (distribution of nuclei is indicated by differences in colors or shades) illustrated in the lower center of FIG. 11 is performed such that information such as a distribution of nuclei and a modification degree distribution required by the user can be grasped at a glance. In the present embodiment, as illustrated on the left side of FIG. 11, conversion may be performed such that the point cloud display and the Heatmap display are superimposed and displayed. That is, in the present embodiment, the display form may be optimized as explained above in order to suppress an increase in the load of the display processing without losing the information desired by the user.

As explained above, in the present embodiment, the conversion unit 104 can perform the conversion processing from the annotation data 802 serving as the reference using the conversion parameters 810 to generate new annotation data 802 incidental to the annotation data 802. In the present embodiment, in this way, for example, even if variations of display magnification and display forms increase, the amount of data stored in the storage unit 130 can be reduced. Therefore, according to the present embodiment, even if the load of the conversion processing for the conversion increases, it is possible to suppress an increase in a load of display processing for extracting and displaying data. As a result, although the annotation data 802 can be edited, it is possible to freely display the data at high speed according to the user's desire.

(Editing Unit 106)

When the user edits the annotation data (the first annotation data or the second annotation data) 802 (for example, a pathological diagnosis result is attached as a label or a contour is corrected), the editing unit 106 can reflect the editing on other annotation data (remaining annotation data) 802. Specifically, in the present embodiment, when the user edits the annotation data 802, editing processing information concerning the editing is stored in the storage unit 130. The editing unit 106 can reflect the editing on the other annotation data based on the editing processing information at the editing timing or at the timing of outputting the other annotation data 802.

In the present embodiment, when the annotation data 802 is edited, the editing processing is reflected on the incidental other annotation data 802 based on the editing processing information. In the present embodiment, in this way, convenience of the user can be enhanced and the amount of data stored in the storage unit 130 can be reduced. According to the present embodiment, for example, even if variations of display forms increase, it is possible to cope with the increase (Output Unit 108)

The output unit 108 can output one or a plurality of annotation data (first and second annotation data) 802 converted or edited by the conversion unit 104 or the editing unit 106 explained above to the display device 20. For example, the output unit 108 can connect a plurality of annotation data 802 and output the plurality of annotation data 802 as one image (WSI) according to the user's operation.

2.3 Fitting Processing

Here, details of the fitting processing explained above are explained. The fitting processing used in the present embodiment can be, for example, "foreground/background fitting", "cell membrane fitting", "cell nucleus fitting", and the like explained above. Details of the kinds of fitting processing are explained below.

The "foreground/background fitting" is fitting processing for a boundary between a foreground and a background. The "foreground/background fitting" can be applied when a target region is, for example, a region having a specimen, a tissue region, an artifact region, an epithelial tissue, a squamous epithelium, a glandular region, a cellular atypical region, or a tissue atypical region. In this case, the fitting processing can be performed using a segmentation algorithm by graph cutting based on image data and a range designated by the user's input operation. Note that machine learning may be used as the segmentation algorithm.

Specifically, in the "foreground-background fitting" processing, for example, as illustrated in FIG. 8, a set of pixels having color values that are the same as or approximate to color values of pixels present in a range designated by the user with the curve 908 on the image data 904 is determined as the target region 912 to be extracted (segmented) and a contour of the target region 912 is acquired. At this time, parts of a region to be a foreground object and a region to be a background object are designated in advance on an image. On the assumption that there is a difference in color values in pixels in regions adjacent to the foreground object and the background object, segmentation can be performed by giving a cost function that minimizes cost when foreground labels or background labels are appropriately attached to all the pixels and calculating a combination of labels that minimizes the cost (graph cutting) (solving an energy minimization problem).

The "cell membrane fitting" is fitting processing for a cell membrane. In this case, features of the cell membrane are recognized from a pathological image and the fitting processing is performed along the contour of the cell membrane based on the recognized features of the cell membrane and a range surrounded by a curve drawn by the user. For example, in the fitting, an edge dyed in brown in membrane staining of immunostaining can be used. Staining conditions are not limited to the examples explained above and may be any staining conditions such as general staining, immunostaining, and fluorescent immunostaining.

Further, "cell nucleus fitting" is fitting for a cell nucleus. In this case, features of the cell nucleus are recognized from a pathological image and the fitting is performed along the contour of the cell nucleus based on the recognized features of the cell nucleus and a range surrounded by a curve drawn by the user. For example, since a nucleus is dyed blue if hematoxylin eosin (HE) is used, in the fitting, staining information by the hematoxylin eosin (HE) can be used. Staining conditions are not limited to the examples explained above and may be any staining conditions such as general staining, immunostaining, and fluorescent immunostaining.

2.4 Information Processing Method

Figure 12:
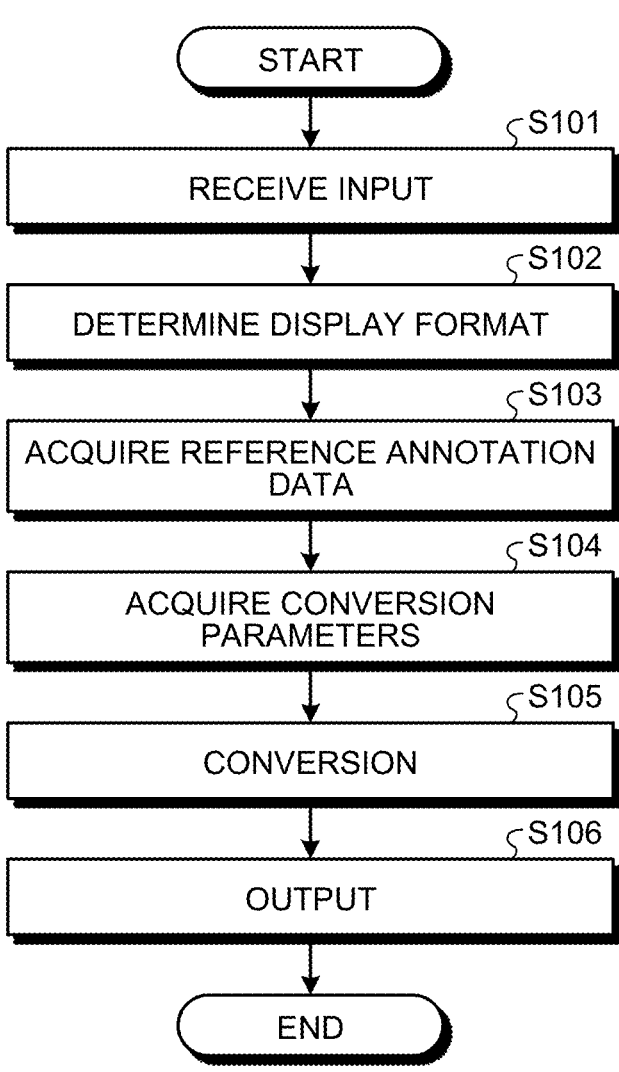
FIG. 12 is a flowchart illustrating an information processing method according to the embodiment of the present disclosure.

The details of the information processing device 10, the processing unit 100, and the fitting according to the present embodiment are explained above. Next, an information processing method according to the present embodiment is explained with reference to FIG. 12. FIG. 12 is a flowchart illustrating the information processing method according to the present embodiment. Specifically, as illustrated in FIG. 12, the information processing method according to the present embodiment includes step S101 to step S106. Details of these steps are explained below.

First, the information processing device 10 receives input of an instruction of enlargement/reduction display, designation of an image enlargement range, designation of a display form, or the like from the user for an image displayed on the display device 20 (step S101). Subsequently, the information processing device 10 determines, based on the input received in step S101 explained above, a display form for display on the display device 20 (step S102).

Then, the information processing device 10 acquires one or a plurality of annotation data 802 from the data stored in the storage unit 130 based on the image displayed on the display device 20, the input received in step S101 explained above, and the display form determined in step S102 explained above (step S103).

Subsequently, the information processing device acquires one or a plurality of conversion parameters 810 from the data stored in the storage unit 130 based on the image displayed on the display device 20, the input received in step S101 explained above, and the display form determined in step S102 explained above (step S104).

Further, the information processing device 10 converts the annotation data 802 acquired in the step S103 explained above using the conversion parameters 810 acquired in step S104 explained above (step S105). The information processing device 10 outputs one or a plurality of annotation data 802 obtained anew in step S105 explained above to the display device 20 (step S106). At this time, when editing is applied to the output annotation data 802, the information processing device 10 acquires editing processing information concerning the editing. Further, the information processing device 10 may edit the incidental annotation data 802 stored in the storage unit 130 using the variant processing information.

3. Summary

As explained above, according to the embodiment of the present disclosure, even an image obtained by connecting a plurality of image data can be freely displayed at high speed. Further, each piece of image data can be edited.

Note that, in the embodiment of the present disclosure explained above, an imaging target is not limited to the biological specimen. The embodiment of the present disclosure explained above is not limited to be applied to a use such as medical or research use and is not particularly limited if the embodiment is applied to a use in which it is requested to perform highly accurate analysis and the like using an image.

4. Application Example

4.1 Microscope System

Figure 13:
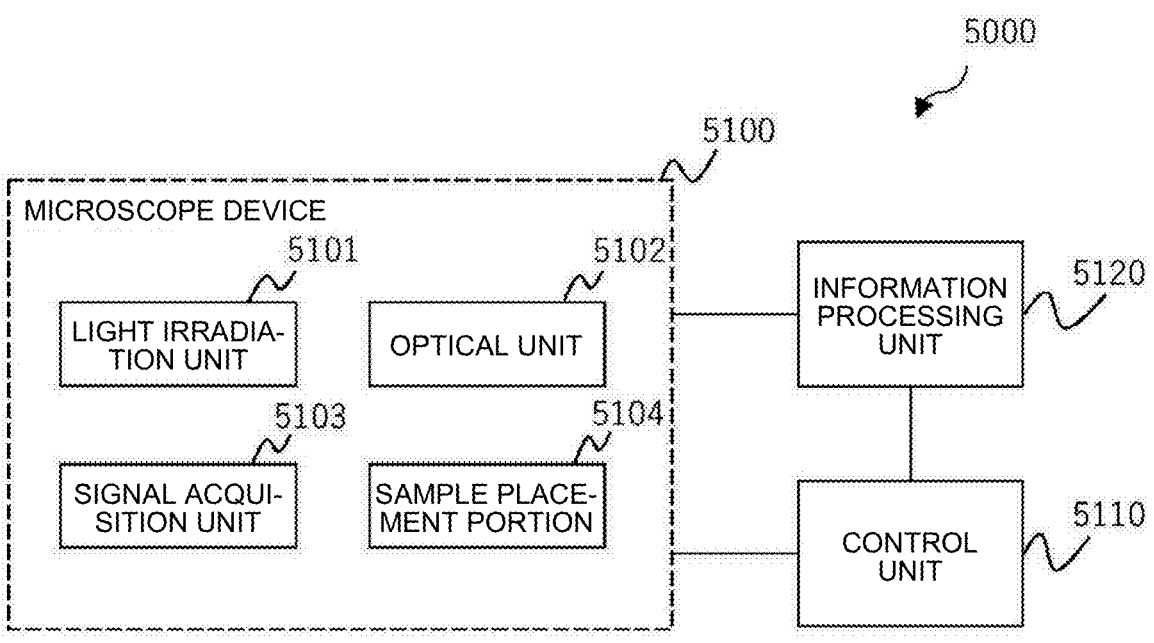
FIG. 13 is a diagram schematically illustrating an overall configuration of a microscope system.

The technology according to the present disclosure can be applied to, for example, a microscope system. In the following explanation, a configuration example of the microscope system to which the technology can be applied is explained with reference to FIG. 13. FIG. 13 illustrates a configuration example of the microscope system.

A microscope system 5000 illustrated in FIG. 13 includes a microscope device 5100, a control unit 5110, and an information processing unit 5120. The microscope device 5100 includes a light irradiation unit 5101, an optical unit 5102, and a signal acquisition unit 5103. The microscope device 5100 may further include a sample placement portion 5104 on which a biologically derived sample S is placed. Note that the configuration of the microscope device is not limited to the configuration illustrated in FIG. 13. For example, the light irradiation unit 5101 may be present on the outside of the microscope device 5100. For example, a light source not included in the microscope device 5100 may be used as the light irradiation unit 5101. The light irradiation unit 5101 may be disposed such that the sample placement portion 5104 is sandwiched between the light irradiation unit 5101 and the optical unit 5102 and, for example, may be disposed on the side where the optical unit 5102 is present. The microscope device 5100 may be configured to be able to execute one or two or more of bright field observation, phase difference observation, differential interference observation, polarization observation, fluorescence observation, and dark field observation.

The microscope system 5000 may be configured as a so-called WSI (Whole Slide Imaging) system or a digital pathology imaging system and can be used for a pathological diagnosis. The microscope system 5000 may also be configured as a fluorescence imaging system, in particular, a multiple fluorescence imaging system.

For example, the microscope system 5000 may be used to perform an intraoperative pathological diagnosis or a remote pathological diagnosis. In the intraoperative pathological diagnosis, while surgery is being performed, the microscope device 5100 can acquire data of the biologically derived sample S acquired from a target person of the surgery and transmit the data to the information processing unit 5120. In the remote pathological diagnosis, the microscope device 5100 can transmit the acquired data of the biologically derived sample S to the information processing unit 5120 present in a place (another room, a building, or the like) separated from the microscope device 5100. In these diagnoses, the information processing unit 5120 receives and outputs the data. Further, the user of the information processing unit 5120 can perform a pathological diagnosis based on the output data.

(Biologically Derived Sample S)

The biologically derived sample S may be a sample containing a biological component. The biological component may be a tissue or a cell of an organism, a liquid component of an organism (blood, urine, or the like), a culture, or a living cell (cardiomyocytes, nerve cells, fertilized egg, or the like). In addition, the biologically derived sample may be a solid or may be a specimen fixed with a fixing reagent such as paraffin or a solid formed by freezing. The biologically derived sample may be a section of the solid. Specific examples of the biologically derived sample include a section of a biopsy sample.

The biologically derived sample may be a sample subjected to treatment such as staining or labeling. The treatment may be staining for showing a form of a biological component or showing a substance (a surface antigen or the like) of a biological component. Examples of the treatment include HE (Hematoxylin-Eosin) staining and Immunohistochemistry staining. The biologically derived sample may be a sample subjected to the treatment with one or more reagents. The reagent can be a fluorescent dye, a coloring reagent, a fluorescent protein, or a fluorescently labeled antibody.

The specimen may be prepared from a tissue sample for the purpose of a pathological diagnosis, clinical examination, or the like. The specimen is not limited to a human body and may be derived from an animal, a plant, or another material. The specimen has different properties depending on a type of a tissue to be used (for example, an organ or a cell), a type of a disease to be targeted, an attribute of a target person (for example, age, sex, blood type, or race), a lifestyle of the target person (for example, dietary habits, exercise habits, or smoking habits), or the like. Therefore, the specimen may be managed with identification information (a one-dimensional or two-dimensional code such as a barcode or a QR code (registered trademark)) capable of identifying each of specimens.

(Light Irradiation Unit 5101)

The light irradiation unit 5101 is a light source for illuminating the biologically derived sample S and an optical system that guides light emitted from the light source to a specimen. The light source may irradiate the biologically derived sample with visible light, ultraviolet light, or infrared light, or a combination thereof. The light source may be one or two or more among a halogen light source, a laser light source, an LED light source, a mercury light source, and a xenon light source. The type and/or wavelength of the light source in the fluorescence observation may be plural and may be appropriately selected by those skilled in the art. The light irradiation unit 5101 can have a configuration of a transmission type, a reflection type, or an epi-illumination type (a coaxial epi-illumination type or a side-illumination type) configuration.

(Optical Unit 5102)

The optical unit 5102 is configured to guide light from the biologically derived sample S to the signal acquisition unit 5103. The optical unit 5102 can be configured to enable the microscope device 5100 to observe or image the biologically derived sample S. The optical unit 5102 can include an objective lens. A type of the objective lens may be selected as appropriate by those skilled in the art according to an observation scheme. The optical unit 5102 may include a relay lens for relaying an image enlarged by the objective lens to the signal acquisition unit. The optical unit 5102 can further include optical components other than the objective lens and the relay lens, an eyepiece lens, a phase plate, and a condenser lens. The optical unit 5102 may further include a wavelength separation unit configured to separate light having a predetermined wavelength from the light from the biologically derived sample S. The wavelength separation unit can be configured to selectively cause light having a predetermined wavelength or in a predetermined wavelength range to reach the signal acquisition unit. The wavelength separation unit may include, for example, one or two or more of a filter that selectively transmits light, a polarizing plate, a prism (a Wollaston prism), and a diffraction grating. The optical components included in the wavelength separation unit may be disposed, for example, on an optical path from the objective lens to the signal acquisition unit. The wavelength separation unit is provided in the microscope device when fluorescence observation is performed, in particular, when the wavelength separation unit includes an excitation light irradiation unit. The wavelength separation unit can be configured to separate fluorescent lights from each other or separate white light and fluorescent light.

(Signal Acquisition Unit 5103)

The signal acquisition unit 5103 can be configured to receive light from the biologically derived sample S and convert the light into an electric signal, in particular, a digital electric signal. The signal acquisition unit 5103 may be configured to be able to acquire data concerning the biologically derived sample S based on the electric signal. The signal acquisition unit 5103 may be configured to be able to acquire data of an image (an image, in particular, a still image, a time-lapse image or a moving image) of the biologically derived sample S and, in particular, can be configured to acquire data of an image enlarged by the optical unit 5102. The signal acquisition unit 5103 includes one or a plurality of imaging elements including a plurality of pixels arrayed to be arranged one-dimensionally or two-dimensionally, a CMOS (Complementary Metal Oxide Semiconductor), or a CCD (Charge Coupled Device). The signal acquisition unit 5103 may include an imaging element for acquiring a low-resolution image and an imaging element for acquiring a high-resolution image or may include an imaging element for sensing for AF (Auto Focus) or the like and an imaging element for image output for observation or the like. In addition to the plurality of pixels, the imaging element can include a signal processing unit (one or two or more of a CPU (Central Processing Unit), a DSP (Digital Signal Processor), and a memory) that performs signal processing using pixel signals from pixels and an output control unit that controls output of image data generated from a pixel signal and processing data generated by the signal processing unit. The imaging element including the plurality of pixels, the signal processing unit, and the output control unit can be preferably configured as a one-chip semiconductor device.

Note that the microscope system 5000 may further include an event detection sensor. The event detection sensor may include a pixel that photoelectrically converts incident light and can be configured to detect, as an event, a luminance change of the pixel exceeding a predetermined threshold. The event detection sensor may be an asynchronous type.

(Control Unit 5110)

The control unit 5110 controls imaging by the microscope device 5100. The control unit 5110 can adjust a positional relation between the optical unit 5102 and the sample placement portion 5104 by driving movement of the optical unit 5102 and/or the sample placement portion 5104 for imaging control. The control unit 5110 can move the optical unit 5102 and/or the sample placement portion 5104 in a direction of approaching or separating from each other (for example, an optical axis direction of the objective lens). The control unit 5110 may move the optical unit 5102 and/or the sample placement portion 5104 in any direction on a surface perpendicular to the optical axis direction. The control unit

5110 may control the light irradiation unit 5101 and/or the signal acquisition unit 5103 for imaging control.

(Sample Placement Portion 5104)

The sample placement portion 5104 may be configured to be able to fix a position of the biologically derived sample S on the sample placement portion 5104 and may be a so-called stage. The sample placement portion 5104 can be configured to be able to move the position of the biologically derived sample S in the optical axis direction of the objective lens and/or in a direction perpendicular to the optical axis direction.

(Information Processing Unit 5120)

The information processing unit 5120 can acquire data (imaging data or the like) acquired by the microscope device 5100 from the microscope device 5100. The information processing unit 5120 can execute image processing on the imaged data. The image processing may include unmixing processing, in particular, spectral unmixing processing. The unmixing processing can include processing for extracting data of light components having a predetermined wavelength or in a predetermined wavelength range from the imaging data to generate image data or processing for removing data of light components having a predetermined wavelength or in a predetermined wavelength range from imaging data. The image processing can include autofluorescence separation processing for separating an autofluorescence component and a dye component of a tissue section and fluorescence separation processing of separating wavelengths of dyes having different fluorescence wavelengths from each other. In the autofluorescence separation processing, processing for removing an autofluorescence component from image information of one sample using an autofluorescence signal extracted from the other sample among a plurality of samples having the same or similar properties may be performed. The information processing unit 5120 may transmit data for imaging control by the control unit 5110. The control unit 5110 that receives the data may control imaging by the microscope device 5100 according to the data.

The information processing unit 5120 may be configured as an information processing device such as a general-purpose computer and may include a CPU, a RAM (Random Access Memory), and a ROM (Read Only Memory). The information processing unit 5120 may be included in a housing of the microscope device 5100 or may be present on the outside of the housing. Various kinds of processing or functions by the information processing unit 5120 may be realized by a server computer or a Cloud connected via a network.

Figure 14:
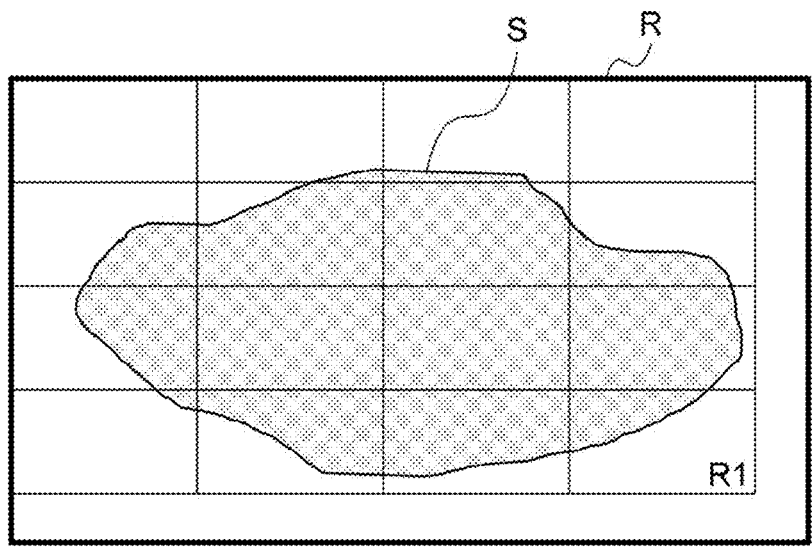
FIG. 14 is a diagram illustrating an example of an imaging scheme.
Figure 15:
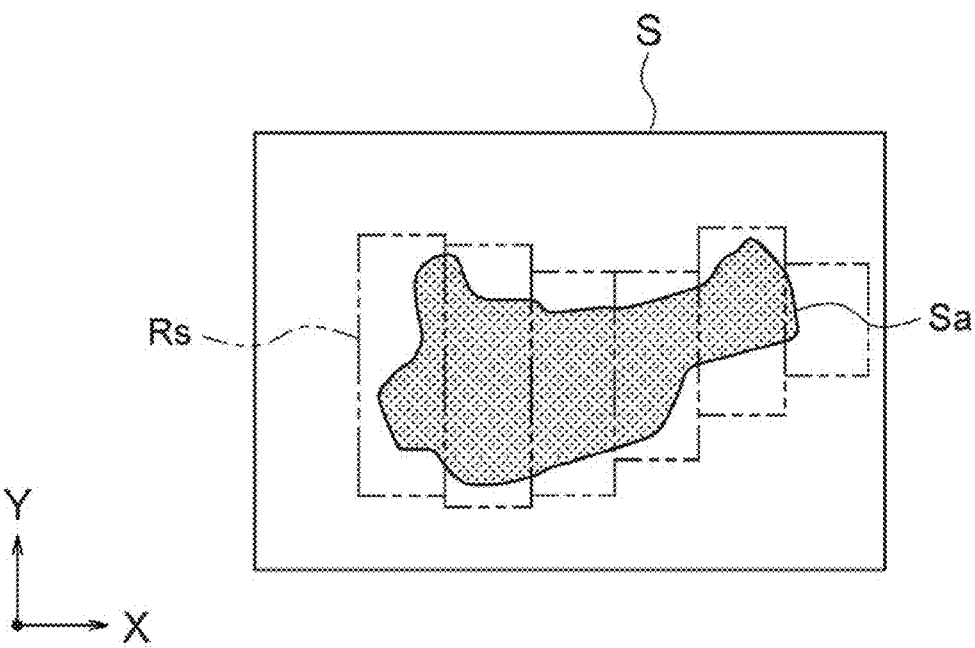
FIG. 15 is a diagram illustrating an example of an imaging scheme.

A scheme for imaging the biologically derived sample S by the microscope device 5100 may be selected as appropriate by those skilled in the art according to a type of the biologically derived sample S, a purpose of imaging, and the like. An example of the imaging scheme is explained below with reference to FIG. 14 and FIG. 15. FIG. 14 and FIG. 15 are diagrams illustrating examples of the imaging scheme.

One example of the imaging scheme is as follows. First, the microscope device 5100 can specify an imaging target region. The imaging target region may be specified to cover an entire region where the biologically derived sample S is present or may be specified to cover an objective portion (a portion where an objective tissue section, an objective cell, or an objective lesion is present) in the biologically derived sample S. Subsequently, the microscope device 5100 divides the imaging target region into a plurality of divided regions having a predetermined size and the microscope device 5100 sequentially images the divided regions. Consequently, images of the divided regions are acquired.

As illustrated in FIG. 14, the microscope device 5100 specifies an imaging target region R covering the entire biologically derived sample S. The microscope device 5100 divides the imaging target region R into sixteen divided regions. The microscope device 5100 can image a divided region R1 and then image any region of regions included in the imaging target region R such as a region adjacent to the divided region R1. Further, the microscope device 5100 images the divided region until there is no un-imaged divided region. Note that the microscope device 5100 may image a region other than the imaging target region R based on captured image information of the divided regions. At this time, a positional relation between the microscope device 5100 and the sample placement portion 5104 is adjusted in order to image the next divided region after imaging a certain divided region. The adjustment can be performed by movement of the microscope device 5100, movement of the sample placement portion 5104, or movement of both of the microscope device 5100 and the sample placement portion 5104.

In this example, the imaging device that images the divided regions may be a two-dimensional imaging element (an area sensor) or a one-dimensional imaging element (a line sensor). The signal acquisition unit 5103 may image the divided regions via the optical unit 5102. The imaging of the divided regions may be continuously performed while the microscope device 5100 and/or the sample placement portion 5104 being moved or the movement of the microscope device 5100 and/or the sample placement portion 5104 may be stopped in imaging the divided regions. Further, the imaging target region may be divided such that parts of the divided regions overlap or the imaging target region may be divided such that the divided regions do not overlap. The divided regions may be imaged a plurality of times while imaging conditions such as a focal length and/or an exposure time being changed.

The information processing unit 5120 can generate image data in a wider region by stitching a plurality of divided regions adjacent to one another. By performing the stitching processing over the entire imaging target region, an image in a wider region can be acquired for the imaging target region. Image data with lower resolution can be generated from the image of the divided region or the image subjected to the stitching processing.

Another example of the imaging scheme is as follows. First, the microscope device 5100 can specify an imaging target region. The imaging target region may be specified to cover an entire region where the biologically derived sample S is present or may be specified to cover an objective portion (a portion where an objective tissue section or an objective cell is present) in the biologically derived sample S. Subsequently, the microscope device 5100 scans and images a partial region (also referred to as "divided scan region") of the imaging target region in one direction (also referred to as "scan direction") in a surface perpendicular to an optical axis. When the scanning of the divided scan region is completed, subsequently, the microscope device 5100 scans the divided scan area next to the scan region. Then, the microscope device 5100 repeats these scanning operations until the entire imaging target region is imaged.

As illustrated in FIG. 15, the microscope device 5100 specifies, as an imaging target region Sa, a region (a gray portion) where a tissue section is present in the biologically derived sample S. The microscope device 5100 scans the divided scan region Rs in the Y-axis direction in the imaging target region Sa. When the scanning of the divided scan region Rs is completed, subsequently, the microscope device 5100 scans the next divided scan region in the X-axis direction. The microscope device 5100 repeats this operation until the scanning is completed for all the imaging target regions Sa.

The positional relation between the microscope device 5100 and the sample placement portion 5104 is adjusted for scanning the divided scan regions and imaging the next divided scan region after imaging a certain divided scan region. The adjustment may be performed by movement of the microscope device 5100, movement of the sample placement portion 5104, or movement of both of the microscope device 5100 and the sample placement portion 5104. In this example, the imaging device that images the divided scan regions may be a one-dimensional imaging element (a line sensor) or a two-dimensional imaging element (an area sensor). The signal acquisition unit 5103 may image the divided regions via a magnifying optical system. The imaging of the divided scan regions may be continuously performed while the microscope device 5100 and/or the sample placement portion 5104 being moved. The imaging target region may be divided such that parts of the divided scan regions overlap or the imaging target region may be divided such that the divided scan regions do not overlap. The divided scan regions may be imaged a plurality of times by changing imaging conditions such as a focal length and/or an exposure time.

The information processing unit 5120 can generate image data in a wider region by stitching a plurality of divided scan regions adjacent to one another. By performing the stitching processing over the entire imaging target region, an image in a wider region can be acquired for the imaging target region. Image data with lower resolution can be generated from the image of the divided scan region or the image subjected to the stitching processing.

4.2 Pathological Diagnosis System

The technology according to the present disclosure may be applied to, for example, a pathological diagnosis system with which a doctor or the like diagnoses a lesion by observing cells or tissues collected from a patient or a support system for the pathological diagnosis system (hereinafter referred to as diagnosis support system). The diagnosis support system may be a WSI (Whole Slide Imaging) system that diagnoses a lesion or supports the diagnosis based on an image acquired using a digital pathology technique.

Figure 16:
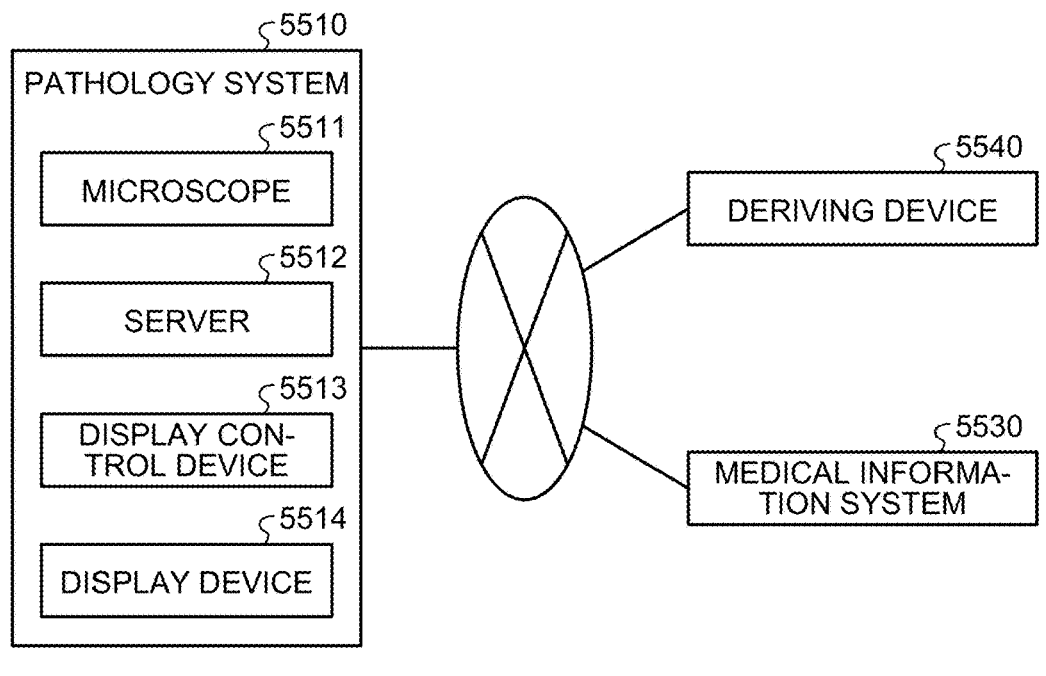
FIG. 16 is a block diagram illustrating an example of a schematic configuration of a diagnosis support system.

FIG. 16 is a diagram illustrating an example of a schematic configuration of a diagnosis support system 5500 to which the technology according to the present disclosure is applied. As illustrated in FIG. 16, the diagnosis support system 5500 includes one or more pathology systems 5510. Further, the diagnosis support system 5500 may include a medical information system 5530 and a deriving device 5540.

Each of the one or more pathology systems 5510 is a system mainly used by a pathologist and is introduced into, for example, a laboratory or a hospital. The pathology systems 5510 may be introduced into hospitals different from one another and are respectively connected to the medical information system 5530 and the deriving device 5540 via various networks such as a WAN (Wide Area Network) (including the Internet), a LAN (Local Area Network), a public line network, and a mobile communication network.

Each of the pathology systems 5510 includes a microscope (specifically, a microscope used in combination with a digital imaging technique) 5511, a server 5512, a display control device 5513, and a display device 5514.

The microscope 5511 has a function of an optical microscope and photographs an observation target stored in a glass slide to acquire a pathological image, which is a digital image. The observation target is, for example, a tissue or a cell collected from a patient and may be a piece of meat of an organ, saliva, blood, or the like. For example, the microscope 5511 functions as the scanner 30 illustrated in FIG. 1.

The server 5512 stores and saves the pathological image acquired by the microscope 5511 in a not-illustrated storage unit. When accepting a browsing request from the display control device 5513, the server 5512 retrieves a pathological image from the not-illustrated storage unit and sends the retrieved pathological image to the display control device 5513. For example, the server 5512 functions as the information processing device 10 according to the embodiment of the present disclosure.

The display control device 5513 transmits a request for viewing the pathological image received from the user to the server 5512. Then, the display control device 5513 displays the pathological image received from the server 5512 on the display device 5514 in which liquid crystal, electro-luminescence (EL), a cathode ray tube (CRT), or the like is used. Note that the display device 5514 may be adapted to 4K or 8K, is not limited to one device, and may be a plurality of devices.

Here, when the observation target is a solid material such as a piece of meat of an organ, the observation target may be, for example, a stained thin slice. The thin slice may be produced, for example, by slicing a block piece cut out from a specimen such as an organ. In the slicing, the block piece may be fixed by paraffin or the like.

For the staining of the thin section, various types of staining may be applied, such as general staining indicating the morphology of a tissue such as HE (Hematoxylin-Eosin) staining or immunostaining or fluorescent immunostaining indicating an immune state of a tissue such as IHC (Immunohistochemistry) staining. At that time, one thin slice may be stained using a plurality of different reagents or two or more thin slices (also referred to as adjacent thin slices) continuously cut out from the same block piece may be stained using different reagents.

The microscope 5511 can include a low-resolution photographing unit for photographing at low resolution and a high-resolution photographing unit for photographing at high resolution. The low-resolution photographing unit and the high-resolution photographing unit may be different optical systems or may be the same optical system. In the case of the same optical system, the resolution of the microscope 5511 may be changed according to a photographing target.

The glass slide storing the observation target is placed on a stage located within an angle of view of the microscope 5511. First, the microscope 5511 acquires an entire image within the angle of view using the low-resolution photographing unit and specifies a region of the observation target from the acquired entire image. Subsequently, the microscope 5511 divides a region where the observation target is present into a plurality of divided regions having a predetermined size and sequentially photographs images of the divided regions with the high-resolution photographing unit to acquire high-resolution images of the divided regions. In switching the target divided region, the stage may be moved, the photographing optical system may be moved, or both of the stage and the photographing optical system may be moved. The divided regions may overlap the divided regions adjacent thereto in order to prevent, for example, occurrence of a photographing omission region due to unintended slip of the glass slide. Further, the entire image may include identification information for associating the entire image and the patient. The identification information may be, for example, a character string or a QR code (registered trademark).

The high-resolution image acquired by the microscope 5511 is input to the server 5512. The server 5512 divides the high-resolution image into partial images (hereinafter referred to as tile images) having a smaller size. For example, the server 5512 divides one high-resolution image into 10×10 one hundred tile images in total. At this time, if the adjacent divided regions overlap, the server 5512 may apply stitching processing to high-resolution images adjacent to one another using a technique such as template matching. In that case, the server 5512 may divide an entire high-resolution image stuck together by the stitching processing to generate tile images. However, the generation of the tile images from the high-resolution image may be performed before the stitching processing.

The server 5512 can generate tile images having a smaller size by further dividing the tile images. The generation of such tile images may be repeated until tile images having a size set as a minimum unit are generated.

When the tile images of the minimum unit are generated in this way, the server 5512 executes, on all the tile images, tile synthesis processing for combining a predetermined number of adjacent tile images to generate one tile image. This tile synthesis processing may be repeated until one tile image is finally generated. By such processing, a tile image group having a pyramid structure in which layers are configured by one or more tile images is generated. In this pyramid structure, the numbers of pixels a tile image in a certain layer and a tile image in a layer different from this layer are the same. However, resolutions the tile images are different. For example, when 2×2 four tile images in total are combined to generate one tile image in an upper layer, the resolution of the tile image in the upper layer is ½ times the resolution of a tile image in a lower layer used for the combination.

By constructing the tile image group having such a pyramid structure, it is possible to switch a detail degree of the observation target displayed on the display device depending on a layer to which a display target tile image belongs. For example, when a tile image in the bottom layer is used, a narrow region of the observation target can be displayed in detail and a wider region of the observation target can be displayed coarser as a tile image in an upper layer is used.

The generated tile image group having the pyramid structure is stored in a not-illustrated storage unit together with, for example, identification information (referred to as tile identification information) that can uniquely identify the tile images. When receiving an acquisition request for a tile image including tile identification information from another device (for example, the display control device 5513 or the deriving device 5540), the server 5512 transmits the tile image corresponding to the tile identification information to the other device.

Note that the tile image, which is the pathological image, may be generated for each of photographing conditions such as a focal length and a staining condition. When the tile image is generated for each of the photographing conditions, another pathological image that corresponds to a photographing condition different from the specific photographing condition and is in the same region as the specific pathological image may be displayed side by side with the specific pathological image. The specific photographing condition may be designated by a viewer. When a plurality of photographing conditions are designated by the viewer, pathological images in the same region corresponding to the photographing conditions may be displayed side by side.

The server 5512 may store the tile image group having the pyramid structure in another storage device other than the server 5512, for example, a Cloud server. Further, a part or all of the entire tile image generation processing explained above may be executed by the Cloud server or the like.

The display control device 5513 extracts a desired tile image from the tile image group of the pyramid structure according to the input operation from the user and outputs the desired tile image to the display device 5514. With such processing, the user can obtain a feeling as if the user is observing the observation target while changing observation magnification. That is, the display control device 5513 functions as a virtual microscope. Virtual observation magnification here is actually equivalent to resolution.

Note that any method may be used as a method of photographing a high-resolution image. The divided regions may be photographed while repeatedly stopping and moving the stage to acquire a high-resolution image or the divided regions may be photographed while moving the stage at predetermined speed to acquire a high-resolution image on a strip. Furthermore, the processing for generating tile images from a high-resolution image is not an essential configuration. An image in which resolution changes stepwise may be generated by changing, stepwise, the resolution of the entire high-resolution image stuck together by the stitching processing. Even in this case, it is possible to present a low-resolution image in a wide area to a high-resolution image in a narrow area to the user stepwise.

The medical information system 5530 is a so-called electronic medical record system and stores information related to diagnosis such as information for identifying a patient, patient disease information, examination information and image information used for the diagnosis, a diagnosis result, and prescription medicine. For example, a pathological image obtained by photographing an observation target of a certain patient can be displayed on the display device 5514 by the display control device 5513 after being once stored via the server 5512. The pathologist using the pathology system 5510 performs pathology diagnosis based on a pathological image displayed on the display device 5514. A result of the pathological diagnosis performed by the pathologist is stored in the medical information system 5530.

The deriving device 5540 can perform analysis on the pathological image. For this analysis, a learning model created by machine learning can be used. The deriving device 5540 may derive a classification result of a specific region, an identification result of a tissue, and the like as an analysis result. Further, the deriving device 5540 may derive identification results such as cell information, a number, a position, and luminance information, scoring information for the identification results, and the like. These pieces of information derived by the deriving device 5540 may be displayed on the display device 5514 of the pathology system 5510 as diagnosis support information.

Note that the deriving device 5540 may be a server system configured by one or more servers (including a Cloud server) or the like. The deriving device 5540 may be configured to be built in, for example, the display control device 5513 or the server 5512 in the pathology system 5510. That is, various analyses on the pathological image may be executed in the pathology system 5510. The technique according to the present disclosure can be suitably applied to the server 5512 as explained above among the components explained above. Specifically, the technique according to the present disclosure can be publicly applied to image processing in the server 5512. By applying the technique according to the present disclosure to the server 5512, a clearer pathological image can be obtained. Therefore, diagnosis of a lesion can be more accurately performed.

Note that the configuration explained above can be applied not only to the diagnosis support system but also to all biological microscopes such as a confocal microscope, a fluorescence microscope, and a video microscope in which a digital imaging technology is used. Here, the observation target may be a biological sample such as a cultured cell, a fertilized egg, or a sperm, a biological material such as a cell sheet or a three-dimensional cell tissue, or an organism such as a zebrafish or a mouse. The observation target can be observed in a state of being stored not only in a glass slide and but also in a well plate, a petri dish, or the like.

Further, a moving image may be generated from a still image of the observation target acquired using a microscope in which the digital imaging technology is used. For example, a moving image may be generated from still images continuously photographed for a predetermined period or an image sequence may be generated from still images photographed at predetermined intervals. By generating the moving image from the still images in this way, it is possible to analyze dynamic characteristics of the observation target such as movement such as pulsation, elongation, and migration of cancer cells, nerve cells, myocardial tissue, sperm, and the like and a division process of cultured cells and fertilized eggs using machine learning.

For example, the information processing system 1 including the information processing device 10, the scanner 30, the learning device 40, and the network 50 is mainly explained above. However, an information processing system including a part the information processing device 10, the scanner 30, the learning device 40, and the network 50 can also be provided. For example, an information processing system including a part or all of the information processing device 10, the scanner 30, and the learning device 40 can also be provided. At this time, the information processing system may not be a combination of the entire devices (a combination of hardware and software).

For example, an information processing system including a first device (a combination of hardware and software) and software of a second device among the information processing device 10, the scanner 30, and the learning device 40 can also be provided. As an example, an information processing system including the scanner 30 (a combination of hardware and software) and software of the information processing device 10 can also be provided. As explained above, according to the embodiment of the present disclosure, the information processing system 1 including a plurality of components optionally selected from the information processing device 10, the scanner 30, and the learning device 40 can also be provided.

5. Hardware Configuration

Figure 17:
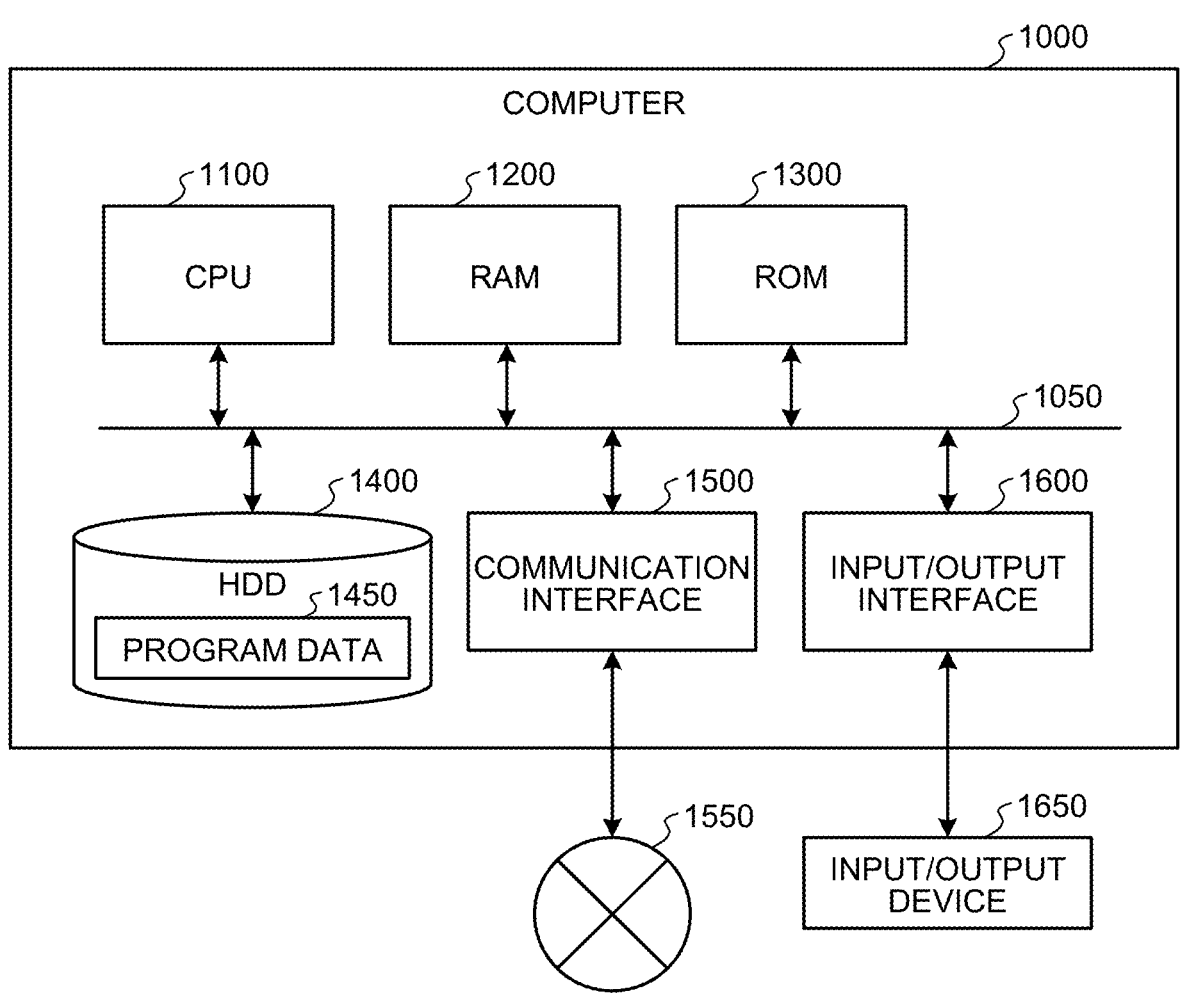
FIG. 17 is a block diagram illustrating a hardware configuration example of an information processing device according to the embodiment of the present disclosure.

The information equipment such as the information processing device 10 according to the embodiments explained above is implemented by, for example, a computer 1000 having a configuration illustrated in FIG. 17. In the following explanation, an information processing device 10 according to the embodiment of the present disclosure is explained as an example. FIG. 17 is a hardware configuration diagram illustrating an example of the computer 1000 that implements the functions of the information processing device 10. The computer 1000 includes a CPU 1100, a RAM 1200, a ROM (Read Only Memory) 1300, a HDD (Hard Disk Drive) 1400, a communication interface 1500, and an input/output interface 1600. The units of the computer 1000 are connected by a bus 1050.

The CPU 1100 operates based on programs stored in the ROM 1300 or the HDD 1400 and controls the units. For example, the CPU 1100 develops, in the RAM 1200, the programs stored in the ROM 1300 or the HDD 1400 and executes processing corresponding to various programs.

The ROM 1300 stores a boot program such as a BIOS (Basic Input Output System) to be executed by the CPU 1100 at a start time of the computer 1000, a program depending on hardware of the computer 1000, and the like.

The HDD 1400 is a computer-readable recording medium that non-transiently records a program to be executed by the CPU 1100, data to be used by such a program, and the like. Specifically, the HDD 1400 is a recording medium that records an information processing program according to the present disclosure, which is an example of program data 1450.

The communication interface 1500 is an interface for the computer 1000 to be connected to an external network 1550 (for example, the Internet). For example, the CPU 1100 receives data from other equipment and transmits data generated by the CPU 1100 to the other equipment via the communication interface 1500.

The input/output interface 1600 is an interface for connecting an input/output device 1650 and the computer 1000. For example, the CPU 1100 receives data from an input device such as a keyboard or a mouse via the input/output interface 1600. The CPU 1100 transmits data to an output device such as a display, a speaker, or a printer via the input/output interface 1600. The input/output interface 1600 may function as a media interface that reads a program or the like recorded in a predetermined computer-readable recording medium (a medium). The medium is, for example, an optical recording medium such as a DVD (Digital Versatile Disc) or a PD (Phase change rewritable Disk), a magneto-optical recording medium such as an MO (Magneto-Optical disk), a tape medium, a magnetic recording medium, or a semiconductor memory.

For example, in a case where the computer 1000 functions as the information processing device 10 according to the embodiment of the present disclosure, the CPU 1100 of the computer 1000 realizes the functions of the processing unit 100 and the like by executing the image processing program loaded on the RAM 1200. The information processing program according to the present disclosure and data in the storage unit 130 may be stored in the HDD 1400. Note that the CPU 1100 reads the program data 1450 from the HDD 1400 and executes the program data 1450. However, as another example, the CPU 1100 may acquire the information processing program from another device via the external network 1550.

The information processing device 10 according to the present embodiment may be applied to a system including a plurality of devices premised on connection to a network (or communication among devices), for example, Cloud computing. That is, the information processing device 10 according to the present embodiment explained above can be implemented as, for example, the information processing system 1 according to the present embodiment by a plurality of devices.

An example of the hardware configuration of the information processing device 10 is explained above. The components explained above may be configured using general-purpose members or may be configured by hardware specialized for the functions of the components. Such a configuration can be changed as appropriate according to a technical level at each time to be implemented.

6. Supplement

Note that the embodiment of the present disclosure explained above can include, for example, an information processing method executed by the information processing device or the information processing system explained above, a program for causing the information processing device to function, and a non-transitory tangible medium in which the program is recorded. The program may be distributed via a communication line (including wireless communication) such as the Internet.

The steps in the information processing method in the embodiment of the present disclosure explained above may not always be processed according to the described order. For example, the steps may be processed with the order changed as appropriate. The steps may be partially processed in parallel or individually instead of being processed in time series. Further, the processing of the steps may not always be processed according to the described method and may be processed by, for example, another functional unit according to another method.

Among the kinds of processing explained in the above embodiments, all or a part of the processing explained as being automatically performed can be manually performed or all or a part of the processing explained as being manually performed can be automatically performed by a publicly-known method. Besides, the processing procedure, the specific names, and the information including the various data and parameters explained in the document and illustrated in the drawings can be optionally changed except when specifically noted otherwise. For example, the various kinds of information illustrated in the figures are not limited to the illustrated information.

The illustrated components of the devices are functionally conceptual and are not always required to be physically configured as illustrated in the figures. That is, specific forms of distribution and integration of the devices are not limited to the illustrated forms and all or a part thereof can be configured by being functionally or physically distributed and integrated in any unit according to various loads, usage situations, and the like.

The preferred embodiment of the present disclosure is explained in detail above with reference to the accompanying drawings. However, the technical scope of the present disclosure is not limited to such an example. It is evident that those having the ordinary knowledge in the technical field of the present disclosure can arrive at various alterations or corrections within the category of the technical idea described in claims. It is understood that these alterations and corrections naturally belong to the technical scope of the present disclosure.

The effects described in the present specification are only explanatory or illustrative and are not limiting. That is, the technique according to the present disclosure can achieve other effects obvious for those skilled in the art from the description of the present specification together with or instead of the effects described above.

Note that the present technique can also take the following configurations.

(1) An information processing device comprising:
- a storage unit that stores first annotation data generated from image data of a biological specimen and conversion processing information;
- a conversion unit that converts, using the conversion processing information, the first annotation data into a plurality of second annotation data incidental to the first annotation data; and
- an output unit that outputs the first annotation data or the second annotation data.

(2) The information processing device according to (1), further comprising:
- an input unit that receives editing operation on the first annotation data or the second annotation data; and
- an editing unit that, when the first annotation data or the second annotation data is edited, reflects the editing on remaining annotation data.

(3) The information processing device according to (2), wherein
- the storage unit further stores editing processing information concerning the editing, and
- the editing unit reflects the editing on the remaining annotation data based on the editing processing information.

(4) The information processing device according to any one of (1) to (3), wherein
- the first annotation data includes point cloud coordinate data, and
- the conversion unit executes conversion based on a conversion formula for converting the point cloud coordinate data.

(5) The information processing device according to any one of (1) to (4), wherein the first annotation data and the second annotation data have different display magnifications.

(6) The information processing device according to (5), wherein the first annotation data has the display magnification lower than the display magnification of the second annotation data.

(7) The information processing device according to (6), wherein the conversion unit performs the conversion into the second annotation data by performing linear expansion processing on the first annotation data using the conversion processing information.

(8) The information processing device according to (6), wherein the conversion unit performs the conversion into each of the second annotation data by performing fitting processing on the first annotation data using the conversion processing information.

(9) The information processing device according to (8), wherein the conversion unit executes, on a predetermined region extracted from the first annotation data, fitting based on a boundary between a foreground and a background, fitting based on a cell membrane, or fitting based on a cell nucleus.

(10) The information processing device according to any one of (5) to (9), wherein the storage unit further stores one or a plurality of third annotation data having the display magnification different from the display magnifications of the first and second annotation data.

(11) The information processing device according to any one of (1) to (4), wherein the first annotation data and the second annotation data have different display forms.

(12) The information processing device according to (11), wherein one of the first and second annotation data is nucleus segmentation display and another of the first and second annotation data is point cloud display or heat map display.

(13) The information processing device according to any one of (1) to (12), wherein the output unit outputs the first annotation data or at least one of the plurality of second annotation data to a display device.

(14) The information processing device according to (13), wherein the storage unit stores a plurality of the first annotation data, and the output unit connects and outputs a plurality of data among the plurality of first annotation data and the plurality of second annotation data according to a user's operation.

(15) The information processing device according to any one of (1) to (14), further comprising a generation unit that generates the first annotation data from the image data.

(16) An information processing device comprising:

a storage unit that stores first annotation data generated from image data and conversion processing information;

a conversion unit that converts, using the conversion processing information, the first annotation data into a plurality of second annotation data incidental to the first annotation data; and an output unit that outputs the first annotation data or the second annotation data.

(17) An information processing method comprising:

storing first annotation data generated from image data of a biological specimen and conversion processing information in a storage unit;

converting, using the conversion processing information, the first annotation data into a plurality of second annotation data incidental to the first annotation data; and outputting the first annotation data or the second annotation data.

(18) An information processing system comprising:

an information processing device that performs output processing for annotation data generated from image data of a biological specimen; and a program for causing the information processing device to execute the output processing, wherein the information processing device includes:

a storage unit that stores first annotation data and conversion processing information;

a conversion unit that converts, using the conversion processing information, the first annotation data into a plurality of second annotation data incidental to the first annotation data; and an output unit that outputs the first annotation data or the second annotation data.

(19) A conversion model for causing a computer to function to convert first annotation data generated from image data of a biological specimen into a plurality of second annotation data incidental to the first annotation data, the computer performing fitting processing on the first annotation data using the conversion model and generating the second annotation data having higher display magnification compared with display magnification of the first annotation data.

REFERENCE SIGNS LIST

1 INFORMATION PROCESSING SYSTEM
10 INFORMATION PROCESSING DEVICE

20 DISPLAY DEVICE
30 SCANNER
40 LEARNING DEVICE
50 NETWORK
100 PROCESSING UNIT
102 GENERATION UNIT
104 CONVERSION UNIT
106 EDITING UNIT
108 OUTPUT UNIT
120 IMAGE DATA RECEIVING UNIT
130, 130a STORAGE UNIT
140 OPERATION UNIT
150 TRANSMISSION UNIT
800a, 800b IMAGE
802, 802a, 802b ANNOTATION DATA
804, 904 IMAGE DATA
806 ANNOTATION DATA GROUP
810 CONVERSION PARAMETER
908 CURVE
912 REGION

The invention claimed is:

1. An information processing device comprising:

circuitry configured to store first annotation data generated from image data of a biological specimen and conversion processing information;

convert, using the conversion processing information, the first annotation data into a plurality of second annotation data incidental to the first annotation data; and output the first annotation data or the second annotation data, wherein the first annotation data has a display magnification lower than a display magnification of the second annotation data, and the circuitry is configured to perform the conversion into the second annotation data by performing linear expansion processing on the first annotation data using the conversion processing information.

2. The information processing device according to claim 1, further comprising:

a user interface configured to receive editing operation on the first annotation data or the second annotation data, wherein when the first annotation data or the second annotation data is edited, the circuitry is configured to reflect the editing on remaining annotation data.

3. The information processing device according to claim 2, wherein the circuitry is configured to:

store editing processing information concerning the editing, and reflect the editing on the remaining annotation data based on the editing processing information.

4. The information processing device according to claim 1, wherein the first annotation data includes point cloud coordinate data, and the circuitry is configured to execute conversion based on a conversion formula for converting the point cloud coordinate data.

5. The information processing device according to claim 1, wherein the circuitry is configured to perform the conversion into each of the second annotation data by performing fitting processing on the first annotation data using the conversion processing information.

6. The information processing device according to claim 1, wherein the first annotation data and the second annotation data have different display forms.

7. The information processing device according to claim 6, wherein one of the first and second annotation data is nucleus segmentation display and another of the first and second annotation data is point cloud display or heat map display.

8. The information processing device according to claim 1, wherein the circuitry is configured to output the first annotation data or at least one of the plurality of second annotation data to a display device.

9. The information processing device according to claim 8, wherein the circuitry is configured to:

store a plurality of the first annotation data; and connect and output a plurality of data among the plurality of first annotation data and the plurality of second annotation data according to a user's operation.

10. The information processing device according to claim 1, wherein the circuitry is configured to generate the first annotation data from the image data.

11. An information processing device comprising:

circuitry configured to store first annotation data generated from image data of a biological specimen and conversion processing information;

convert, using the conversion processing information, the first annotation data into a plurality of second annotation data incidental to the first annotation data; and output the first annotation data or the second annotation data, wherein the first annotation data and the second annotation data have different display magnifications, and the circuitry is configured to store one or a plurality of third annotation data having the display magnification different from the display magnifications of the first and second annotation data.

\* \* \* \* \*